(12) United States Patent
Curry

(10) Patent No.: US 10,542,652 B2
(45) Date of Patent: Jan. 28, 2020

(54) ASYMMETRIC TEREBRATING SHOVEL WITH LATERAL DISPLACEMENT SLIDE SURFACE AND PIVOTING LEVEL LEG

(71) Applicant: Jon K Curry, Chino Valley, AZ (US)

(72) Inventor: Jon K Curry, Chino Valley, AZ (US)

( * ) Notice: Subject to any disclaimer, the term of this patent is extended or adjusted under 35 U.S.C. 154(b) by 191 days.

(21) Appl. No.: 14/545,101

(22) Filed: Mar. 26, 2015

(65) Prior Publication Data
US 2015/0319909 A1   Nov. 12, 2015

Related U.S. Application Data

(63) Continuation-in-part of application No. 13/987,636, filed on Aug. 16, 2013, now abandoned.

(60) Provisional application No. 61/998,908, filed on Jul. 11, 2014, provisional application No. 61/967,836, filed on Mar. 27, 2014, provisional application No. 61/957,915, filed on Jul. 15, 2013.

(51) Int. Cl.
   *A01B 1/02* (2006.01)
(52) U.S. Cl.
   CPC .................................... *A01B 1/02* (2013.01)
(58) Field of Classification Search
   CPC .......... E01H 5/02; E04D 13/106; A01B 1/06; A01B 1/065; A01B 1/16; A01B 1/18; A01B 1/02; A01B 1/00; A01B 1/08; A01B 1/22; B25G 1/04
   USPC .................................................. 294/54.5, 49
   See application file for complete search history.

(56) References Cited

U.S. PATENT DOCUMENTS

| | | | | |
|---|---|---|---|---|
| 631,713 | A * | 8/1899 | Goodwin | A47J 43/281 30/142 |
| 1,053,005 | A * | 2/1913 | Brown | A01B 1/16 30/315 |
| 1,101,713 | A * | 6/1914 | Putnam | A01G 3/06 172/13 |
| 1,546,463 | A * | 7/1925 | Ayres | A01G 3/06 172/13 |
| 2,116,852 | A * | 5/1938 | Stanford | A01G 23/00 294/51 |
| 2,137,458 | A * | 11/1938 | Phelps | A47J 45/10 294/2 |
| 2,251,842 | A * | 8/1941 | Hill | A47J 17/02 30/121.5 |
| 2,419,719 | A * | 4/1947 | Kennedy | A01B 1/06 172/372 |
| 3,234,720 | A * | 2/1966 | Blodgett | A01B 1/16 56/400.05 |
| 4,700,420 | A * | 10/1987 | Belanger | B25F 1/02 182/100 |
| 4,726,090 | A * | 2/1988 | Kilpatrick | E04D 13/0765 15/144.1 |
| 4,736,928 | A * | 4/1988 | Smilkstein | A01B 1/16 254/132 |
| D319,952 | S * | 9/1991 | Harvey, Sr. | D8/10 |
| 6,763,542 | B2 * | 7/2004 | Huang | A62C 8/00 7/116 |

(Continued)

*Primary Examiner* — Jessica H Lutz
(74) *Attorney, Agent, or Firm* — David G. Duckworth

(57) ABSTRACT

The asymmetrical head of a shovel incorporates a vertically oriented metatarsal edge extending upwardly from the tip of the head to a recessed offset dorsal edge offset along the entire length of the dorsal edge from the tip of the head. The construction of the head permits it to function both as a pivot and as a lever, as well as facilitating the initial penetration of the head in soil.

1 Claim, 21 Drawing Sheets

(56) References Cited

U.S. PATENT DOCUMENTS

D653,510 S * 2/2012 Huff .................................. D8/10
D712,710 S * 9/2014 Gonzales ........................ D7/688

* cited by examiner

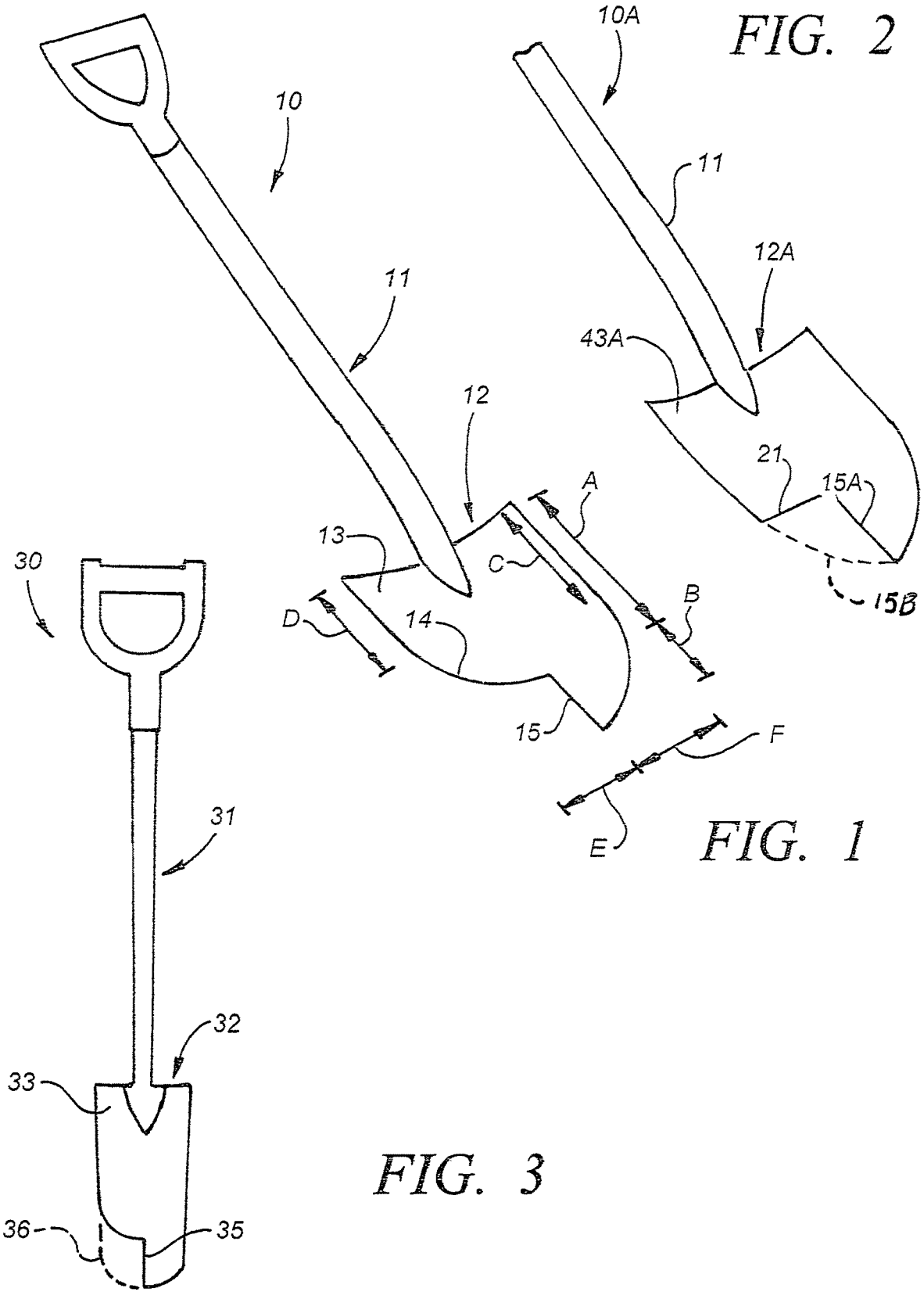

ASYMMETRIC TEREBRATING SHOVEL WITH LATERAL DISPLACEMENT SLIDE SURFACE AND PIVOTING LEVEL LEG

This application is a continuation-in-part of U.S. Ser. No. 13/987,636 filed Aug. 16, 2013 which claimed priority on U.S. Provisional Ser. No. 61/957,915 filed Jul. 15, 2013. This application claims priority based on U.S. Provisional Application Ser. No. 61/967,836 filed Mar. 27, 2014 and U.S. Provisional application Ser. No. 61/998,908 filed Jul. 11, 2014.

This invention relates to tools.

A wide variety of tools have been developed. Those of skill in the art have for many years endeavored to produce improved tools which facilitate the completion of various tasks.

Accordingly, it would be highly desirable to provide an improved tool.

Therefore, it is a principal object of the instant invention to provide a new hand tool.

This and other, further and more specific objects and advantages of the invention will be apparent to those skilled in the art from the following detailed description thereof, taken in conjunction with the drawings, in which:

FIG. 1 is a perspective view illustrating a shovel constructed in accordance with the principles of the invention;

FIG. 2 is a perspective view illustrating a shovel constructed in accordance with an alternate embodiment of the invention;

FIG. 3 is a front view illustrating a shovel constructed in accordance with another embodiment of the invention;

Figures 4, 5:
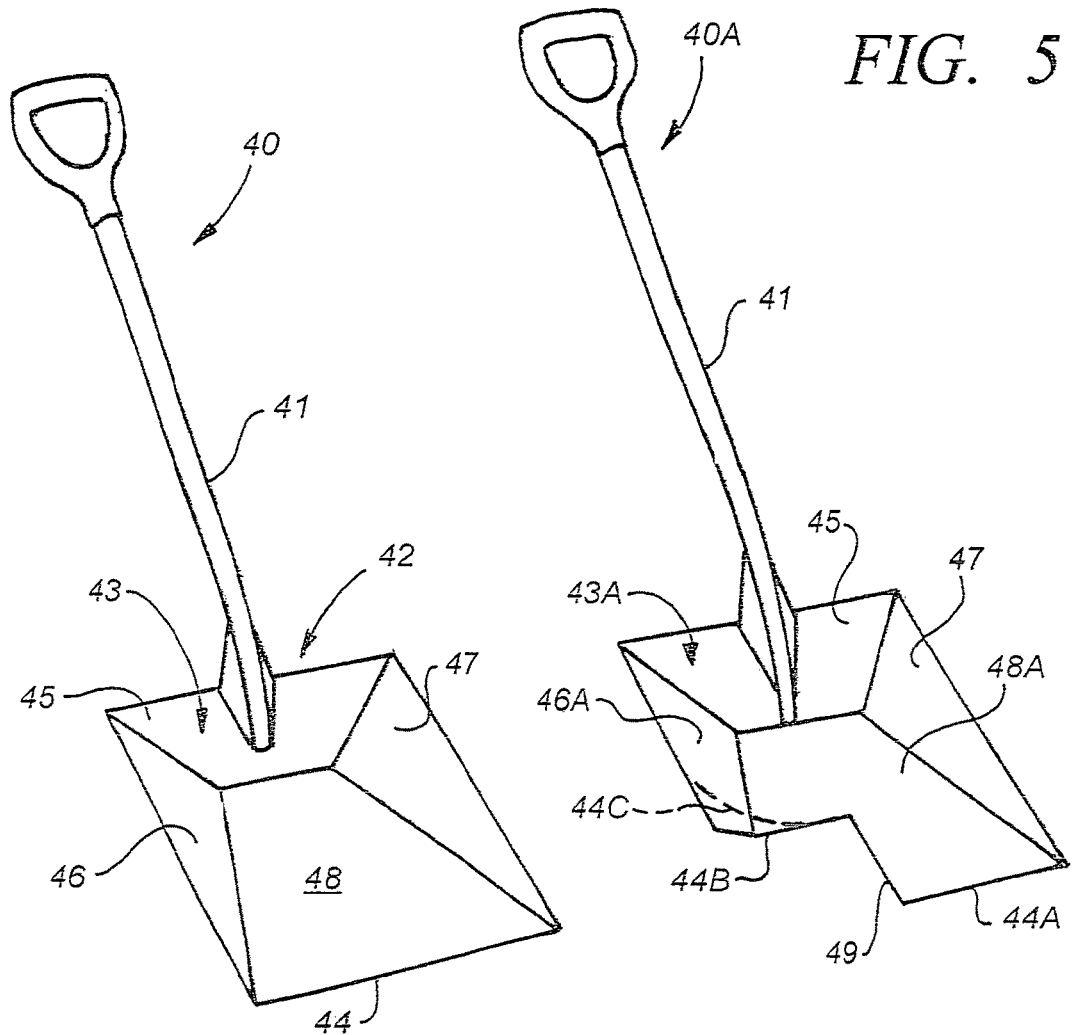
FIG. 4 is a perspective view illustrating a conventional shovel design.
FIG. 5 is a perspective view illustrating the shovel of FIG. 4 modified in accordance with another embodiment of the invention.

Briefly, in accordance with the invention, an improved shovel to remove earth from around a generally cylindrically shaped root buried beneath the surface of the ground. The root has external side, top, and bottom surfaces. The shovel comprises an elongate handle having a proximate end, a distal end, and a longitudinal axis; and, an asymmetrical head. The head includes an upper end connected to the distal end of the handle and having first and second peripheral side edges generally parallel to the longitudinal axis; includes a lower end spaced apart from the upper end and the distal end of the handle, the lower end having a ground engaging edge; includes a face extending over the upper and lower ends; and, includes a tip shaped and dimensioned to penetrate earth. The lower end includes a first convex arcuate peripheral edge terminating at the tip and extending upwardly to the first peripheral side edge; includes a second convex arcuate peripheral edge spaced apart from the first arcuate peripheral edge, having an end point positioned above and spaced apart from the tip and below the upper end of the head, and extending upwardly from the end point to the second peripheral side edge; and, includes a substantially straight edge extending from the tip upwardly to the end point and generally parallel to the longitudinal axis. The ground engaging edge of the lower end collectively comprises the first and second arcuate peripheral edges and the substantially straight edge. The shovel is movable between at least three operative positions, a first operative rotation position with the tip contacting an external side surface of the root at a pivot point and the second arcuate peripheral edge spaced apart from the root; a second operative lever position with the handle generally vertically oriented, and with the second arcuate peripheral edge contacting the external top surface of the root and the straight edge contacting an external side surface of the root at a fulcrum point such that the tip is not positioned beneath the root; and, a third operative lever position with the handle canted away from vertical, and, with the second arcuate peripheral edge contacting the external top surface of the root and the straight edge contacting an external side surface of the root at a fulcrum point such that the tip is positioned beneath the root.

In a further embodiment of the invention, provided is a process to remove earth from around a generally cylindrically shaped root buried beneath the surface of the ground. The root has external side, top, and bottom surfaces. The process comprises the step of providing a shovel. The shovel comprises an elongate handle having a proximate end, a distal end, and a longitudinal axis; and, an asymmetrical head. The head includes an upper end connected to the distal end of the handle and having first and second peripheral side edges generally parallel to the longitudinal axis; includes a lower end spaced apart from the upper end and the distal end of the handle, the lower end having a ground engaging edge; includes a face extending over the upper and lower ends; and, includes a tip shaped and dimensioned to penetrate earth. The lower end includes a first convex arcuate peripheral edge terminating at the tip and extending upwardly to the first peripheral side edge; includes a second convex arcuate peripheral edge spaced apart from the first arcuate peripheral edge, having an end point positioned above and spaced apart from the tip and below the upper end of the head, and extending upwardly from the end point to the second peripheral side edge; and, includes a substantially straight edge extending from the tip upwardly to the end point and generally parallel to the longitudinal axis. The ground engaging edge of the lower end collectively comprises the first and second arcuate peripheral edges and the substantially straight edge. The shovel is movable between at least three operative positions, a first operative rotation position with the tip contacting an external side surface of the root at a pivot point and the second arcuate peripheral edge spaced apart from the root; a second operative lever position with the handle generally vertically oriented, and with the second arcuate peripheral edge contacting the external top surface of the root and the straight edge contacting an external side surface of the root at a fulcrum point such that the tip is not positioned beneath the root; and, a third operative lever position with the handle canted away from vertical, and, with the second arcuate peripheral edge contacting the external top surface of the root and the straight edge contacting an external side surface of the root at a fulcrum point such that the tip is positioned beneath the root. The process also comprises the steps of displacing the head into the ground to the first operative position; tilting the handle to pivot the shovel about the pivot point to loosen earth; displacing the head to the second operative position; tilting the handle to pivot the straight edge about the first fulcrum point; displacing the head to the third operative position; and, tilting the handle to pivot the straight edge about the second fulcrum point and move the tip to a point beneath the root.

In another embodiment of the invention, provided is a process to remove earth from the ground. The process comprises the step of providing a tool. The tool comprises an elongate handle having a proximate end, a distal end, and a longitudinal axis; and, an asymmetrical head. The head includes an upper end connected to the distal end of the handle and having first and second peripheral side edges generally parallel to the longitudinal axis; a lower end spaced apart from the upper end and the distal end of the handle, the lower end having a ground engaging edge; a face extending over the upper and lower ends; and, a tip shaped and dimensioned to penetrate earth. The lower end includes a first convex arcuate peripheral edge terminating at the tip and extending upwardly to the first peripheral side edge; a second convex arcuate peripheral edge spaced apart from the first arcuate peripheral edge, having an end point spaced apart from and positioned above the tip and below the upper end of the head, and extending upwardly from the end point to the second peripheral side edge; and, a substantially straight edge extending from the tip upwardly to the end point and generally parallel to the longitudinal axis. The ground engaging edge of the lower end collectively comprises the first and second arcuate peripheral edges and the substantially straight edge. The process also includes the step of displacing the head into the ground to remove earth from the ground.

In still a further embodiment of the invention, provided is an improved shovel. The shovel comprises an elongate handle having a proximate end, a distal end, and a longitudinal axis; and, an asymmetrical head. The asymmetrical head includes an upper end connected to the distal end of the handle and having first and second peripheral distal side edges generally parallel to the longitudinal axis; a lower end spaced apart from the upper end and the distal end of the handle, the lower end having a ground engaging edge; and, a face extending over the upper and lower ends. The lower end includes a first convex arcuate peripheral proximate edge terminating at the tip and extending upwardly to the first peripheral distal side edge; and, a second convex arcuate peripheral dorsal edge. The dorsal edge is spaced apart from the first arcuate peripheral edge; has an end point spaced apart from and positioned above the tip and below the upper end of the head; extends upwardly from the end point to the second peripheral side edge; and, is offset from the end point along the entire length of the dorsal edge. The lower end also includes a substantially straight vertically oriented metatarsal edge extending from the tip upwardly to the end point of the dorsal edge. The metatarsal edge is generally parallel to said longitudinal axis.

In still another embodiment of the invention, provided is an improved process to remove earth from the ground. The process comprises the step of providing a tool. The tool comprises an elongate handle having a proximate end, a distal end, and a longitudinal axis; and, an asymmetrical head. The head includes an upper end connected to the distal end of the handle and having first and second peripheral side distal edges generally parallel to the longitudinal axis; and includes a lower end. The lower end is spaced apart from the upper end and the distal end of the handle, and has a ground engaging edge. The head also includes a face extending over the upper and lower ends; and, a tip shaped and dimensioned to penetrate earth. The lower end includes a first convex arcuate peripheral proximate edge terminating at the tip and extending upwardly to the first peripheral side edge; and, a second convex arcuate peripheral dorsal edge spaced apart from the first arcuate peripheral edge, having an end point spaced apart from and positioned above the tip and below the upper end of the head, and extending upwardly from the end point to the second peripheral side edge. The head also includes a substantially straight metatarsal edge extending from the tip upwardly to the end point. The ground engaging edge of the lower end collectively comprises the proximate edge, the metatarsal edge, the dorsal edge, and the tip. The method also comprises the step of displacing the head tip into the ground to remove earth from the ground.

Turning now to the drawings, which describe the presently preferred embodiments of the invention for the purpose of illustrating the practice thereof and not by way of limitation of the scope of the invention, and in which like characters refer to corresponding elements throughout the several views, FIGS. 1, 10 to 13 illustrate a shovel 10 constructed in accordance with one embodiment of the invention.

Figure 11:
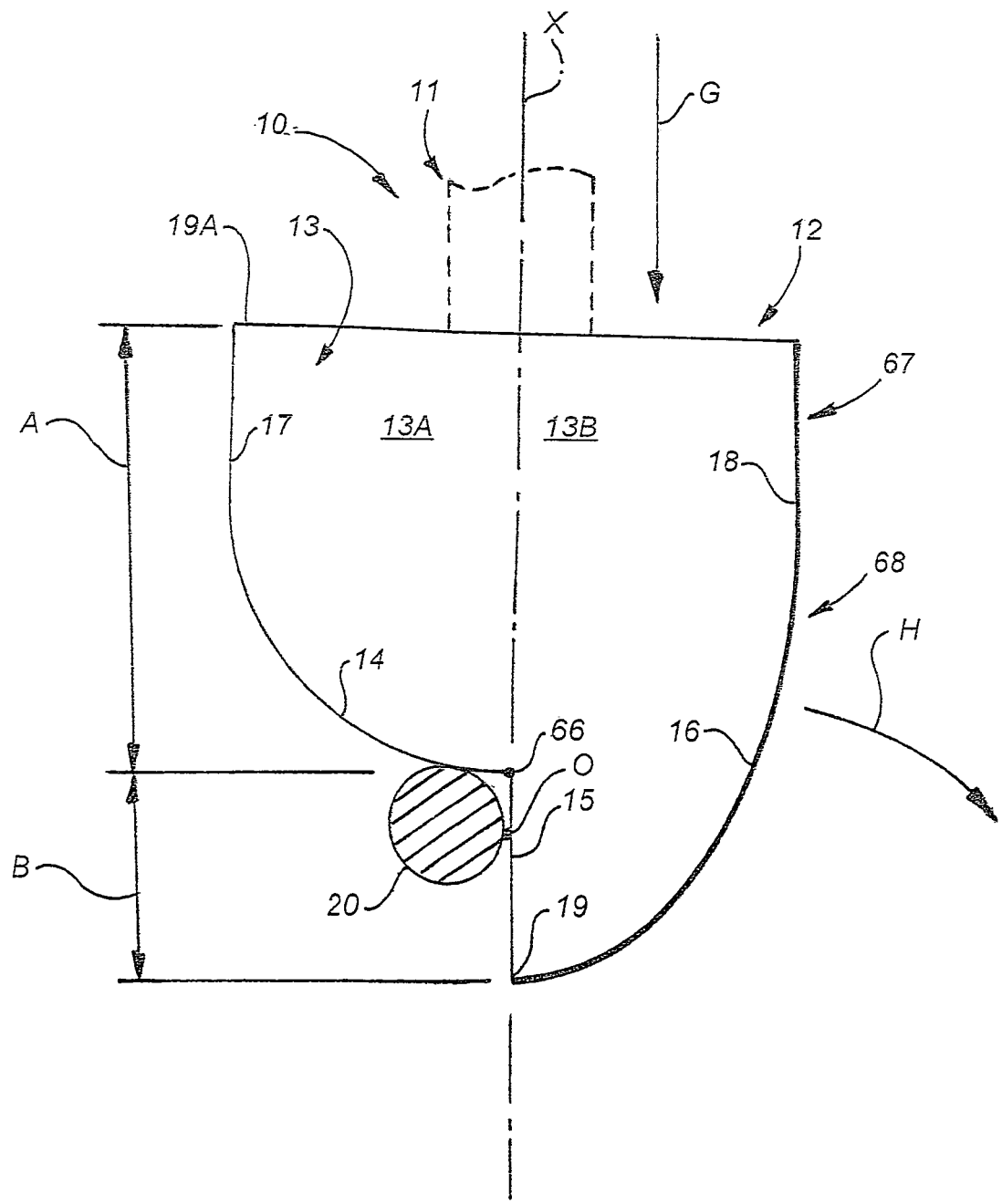
FIG. 11 is a front view further illustrating the mode of operation of the shovel of FIG. 1.

Manually operated shovel 10 is utilized to remove earth from around a generally cylindrically shaped root 20 buried beneath the surface of the ground. The root has external side, top, and bottom surfaces. Shovel 10 comprises an elongate handle 11 having a proximate end, a distal end, and a longitudinal axis X (FIG. 11), and, comprises an asymmetrical head 12. Head 12 includes an upper end 67 connected to the distal end of the handle and includes first distal peripheral side edge 18 and second distal peripheral side edge 17 each generally parallel to longitudinal axis X. Head 12 also includes a lower end 68 spaced apart from the upper end and the distal end of the handle 11. The lower end of head 12 has a ground engaging edge comprising proximate edge 16, metatarsal edge 15, and dorsal edge 14. Head 12 also includes a face 13 extending over the upper and lower ends, and a tip 19 shaped and dimensioned to penetrate earth. In FIG. 11, surface area 13A of face 13 extends to the left of axis X, while surface area 13B of face 13 extends to the right of axis X. Areas 13A and 13B together comprise substantially the entire surface area of face 13. Head 12 includes upper edge 19 (FIG. 11). When shovel 10 is in its normal upright orientation with axis X vertically oriented, edge or shoulder 19A is generally horizontally oriented in the manner illustrated in FIG. 11.

Further, the lower end 68 of head 12 includes a first convex arcuate peripheral proximate edge 16 terminating at tip 19 and extending upwardly to the first distal edge 18 (FIG. 11).

The lower end of head 12 also includes a second convex arcuate dorsal edge 14 spaced apart from the first arcuate peripheral proximate edge 16, and having an end point 66 spaced apart from and positioned above tip 19. Dorsal edge 14 is spaced below the upper end 67 of head 12, and extends upwardly from end point 66 to the second peripheral side distal edge 17. The radius of curvature of proximate edge 16 near tip 19 ordinarily is different than the radius of curvature of edge 14 near point 66. The radius of curvature along most or all of arcuate edge 14 also is normally different from the radius of curvature along most or all of arcuate edge 16. In particular, the radius of curvature of edge 14 normally, although not necessarily, is less than that of edge 16.

The lower end 68 also includes substantially straight metatarsal edge 15 extending from tip 19 upwardly to end point 66 and generally parallel to longitudinal axis X. When shovel 10 is in its normal upright orientation, edge 15 is substantially vertically oriented in the manner illustrated in FIG. 11. Head 12 can be constructed such that—when shovel 10 is in its normal upright orientation—edge 15 is canted from the vertical and is not substantially vertical. In order, however, for shovel 10 and edge 15 to perform the rotational and lever functions described below, it is preferred that head 12 be constructed such that edge 15 be canted no more than twenty degrees, preferably no more than ten degrees, and more preferably no more than five degrees from the vertical when shovel 10 is in its normal upright orientation, which orientation is illustrated in FIG. 11. The ground engaging edge of the lower end 68 of head 12 collectively comprises the proximate edge 16, dorsal edge 14 and metatarsal edge 15.

Figure 10:
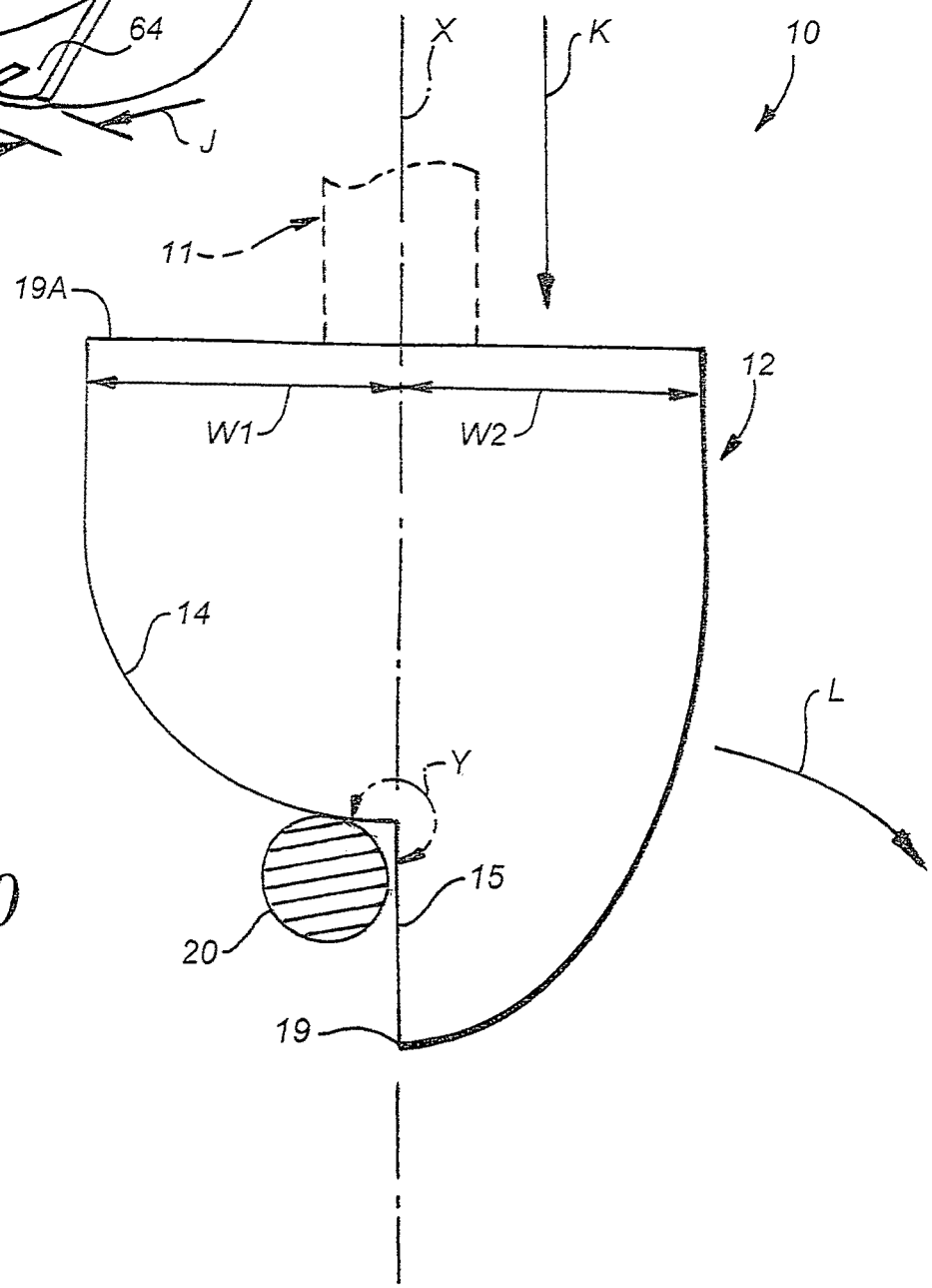
FIG. 10 is a front view illustrating the mode of operation of the shovel of FIG. 1.

The overall length of head 12 equals the length indicated by arrows A plus the length indicated by arrows B (FIG. 11). Arrows B indicate the length of edge 15. The overall maximum width of head 12 equals the length indicated by arrows W1 plus the length indicated by arrows W2 (FIG. 10). Arrows Y in FIG. 10 indicate an exterior angle extending from edge 15 to the portion of edge 14 adjacent point 66 (FIG. 11). Angle Y can vary, and can, for example, be greater than 270. However, angle Y normally preferably is 270 degrees or less. An angle Y of 270 degrees or less is desirable because, when a downward force K (FIG. 10) is applied the head 12, angle Y facilitates dorsal edge 14 sliding laterally over root 20 in the manner indicated by arrow L in FIG. 10. This reduces the likelihood that downward movement of head 13 will be completely stopped if head 12 strikes a root 20.

Shovel 10 is movable between at least three operative positions comprising first, second, and third operative positions. In the first operative position, illustrated in FIG. 13, tip 19 contacts an external side surface of a root 20 at a pivot point P while the dorsal edge 14 is spaced apart from the root.

In the second operative lever position illustrated in FIG. 11, handle 11 is generally vertically oriented; the dorsal edge 14 contacts the external top surface of the root 20; and, the metatarsal edge 15 contacts an external side surface of the root 20 at a fulcrum point O such that tip 19 is not positioned directly beneath the root.

In the third operative lever position, handle 11 and head 12 are canted away from vertical, the dorsal edge 14 contacts the external top surface of the root 20, and metatarsal edge 15 contacting an external side surface of the root 29 at fulcrum point O such that tip 19 is positioned directly beneath the root 20.

Since shovel 10 is asymmetrical, the area of surface 13A is smaller than (or at least different from) the area of surface 13B. The ratio of the area of surface 13B to the area of surface 13A is in the range of 8.0:3.0 to 3.2:3.0, preferably 6.0:3.0 to 3.25:3.0, more preferably 5.0:3.0 to 3.5:3.0. The ratio of the total length of shovel 10 (i.e., the length of arrows A plus the length of arrows B) to the length of metatarsal edge 15 (i.e., the length of arrows B) can vary as desired but preferably is in the range of 30.0:1.0 to 1.5 to 1.0, preferably 8.0:1.0 to 1.75:1.0, and more preferably 6.0:1.0 to 2.0 to 1.0.

In use of shovel 10, an upright individual grasps handle 11 and, in conventional fashion, places one a foot on upper edge 19A (FIG. 11) and presses downwardly with the foot to generate a force G to displace tip 19 into the ground. The use of metatarsal edge 15 in combination with proximate edge 16 produces a point which functions to more readily penetrate soil that the generally semi-circular or semi-elliptical leading edge of a conventional shovel. Once shovel 10 has penetrated a desired distance into the ground, the shovel is extracted from the ground, carrying with it soil on the face 13 of the shovel.

The ability of tip 19 and edges 15 and 16 to more readily penetrate the ground is a particular important virtue of shovel 10. Edge 15 ordinarily provides insignificant frictional resistance as tip 19 travels into the ground. Similarly, edge 16 and the portion of face 13 intermediate edges 15 and 16 provides significantly less frictional resistance than does a conventional shovel which has a symmetrical head 12 that includes an opposing pair of edges 16 each extending upwardly away from each other and from the tip 19 of the shovel to produce a generally semi-circular or semi-elliptical leading edge. After head 12 travels into the ground a distance equal to the length B of edge 15, edge 14 begins to penetrate the ground and, along with the portion of face 12 extending upwardly from edge 14, to produce additional frictional resistance which makes forcing head 12 into the ground more difficult.

Shovel 10 can be positioned such that the shovel is substantially upright in the manner illustrated in FIG. 11 and such that tip 19 of the face of the shovel is positioned adjacent a side of a root 20 at a point P. The handle 11 of shovel 10 can then be manually tilted such that handle 11 and head 12 move laterally in the direction of arrow L to the canted position illustrated in FIG. 13. When handle 11 and head 12 move in this manner, they are, in essence, pivoting about point P and are using root 20 to counteract a force generated in the direction of arrow S when head 12 pivots in the direction of arrow L. Pivoting head 12 in this manner is useful in loosening earth to one side of root 20 when shovel 10 is being utilized to remove earth around root 20. Pivoting head 12 in this manner is useful because root 20 often typically does not move readily when shovel 10 initially removes earth from around root 20, and because the ability to position tip 19 at a side of root 20 facilitates using shovel 10 as a pivot tool.

Shovel 10 can be positioned such that (a) the shovel 10 is substantially upright in the manner illustrated in FIG. 11, (b) a point O on metatarsal edge 15 intermediate point 66 and tip 19 contacts a side of root 20, and (c) dorsal edge 14 contacts the top of root 20. The handle 11 of shovel 10 can then be manually tilted such that handle 11 and head 12 move laterally in the direction of arrow H in FIG. 11 (or arrow L in FIG. 12) to the canted position illustrated in FIG. 12. When handle 11 and head 12 move in this manner, edge 15 functions as a lever and pivots about a fulcrum represented by point O in FIG. 12. Pivoting head 12 in this manner is useful in a couple of respects. First, pivoting heat 12 to the position illustrated in FIG. 12 displaces tip 19 to a position beneath root 20 and functions to loosen earth beneath root 20. Second, pivoting head 12 in the direction of arrow L in FIG. 12 moves the convex dorsal edge 14 along the top of root 20. The upward convex shape of edge 14 promotes the tendency of edge 14 to slide laterally off root 20 in the direction of arrow L; this because the convex shape of edge 14 produces a lateral "slide inducing" force when an individual using shovel 10 presses shovel 10, downwardly in the direction of arrow K.

Figure 12:
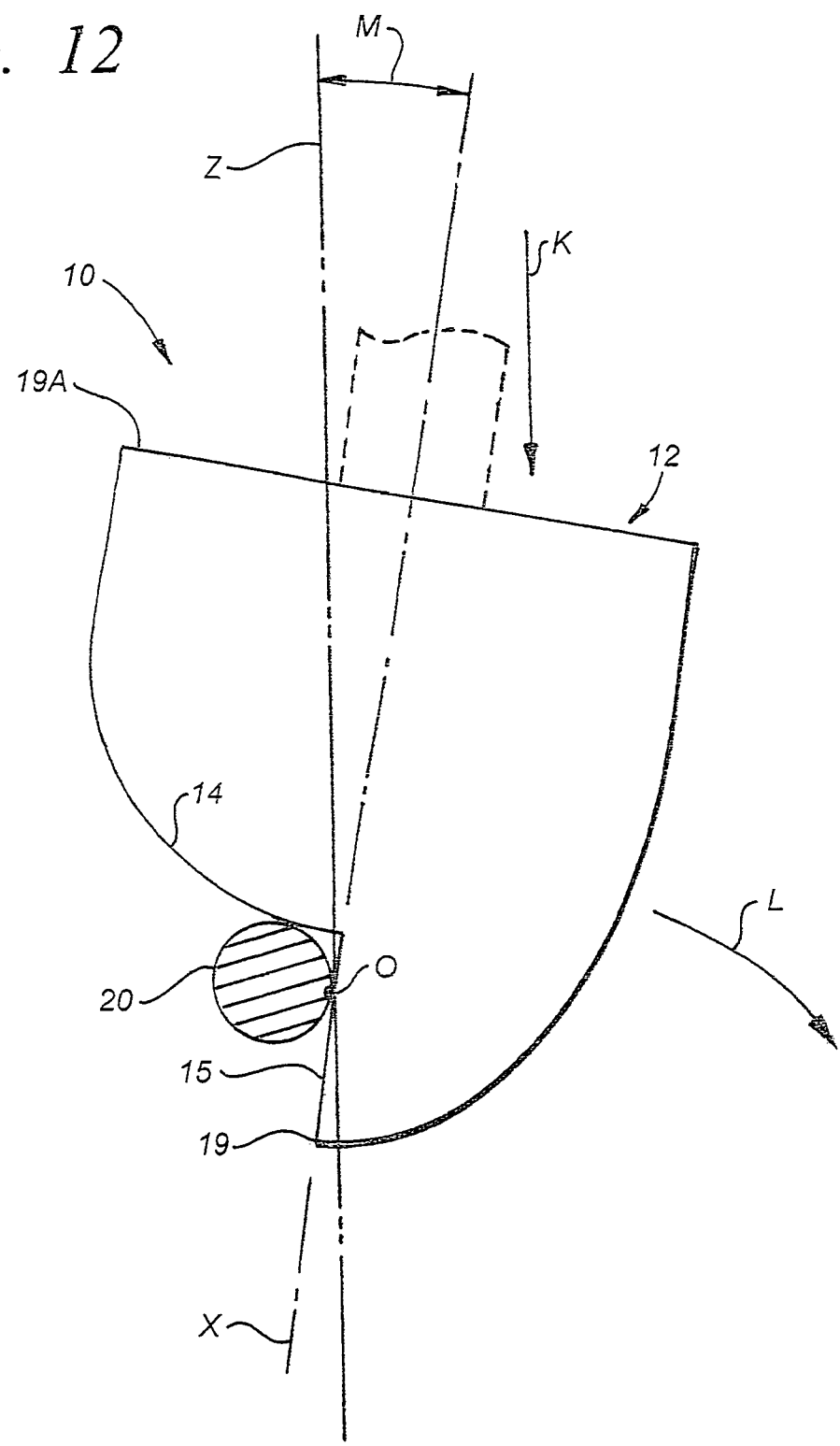
FIG. 12 is a front view further illustrating the mode of operation of the shovel of FIG. 1.
Figure 13:
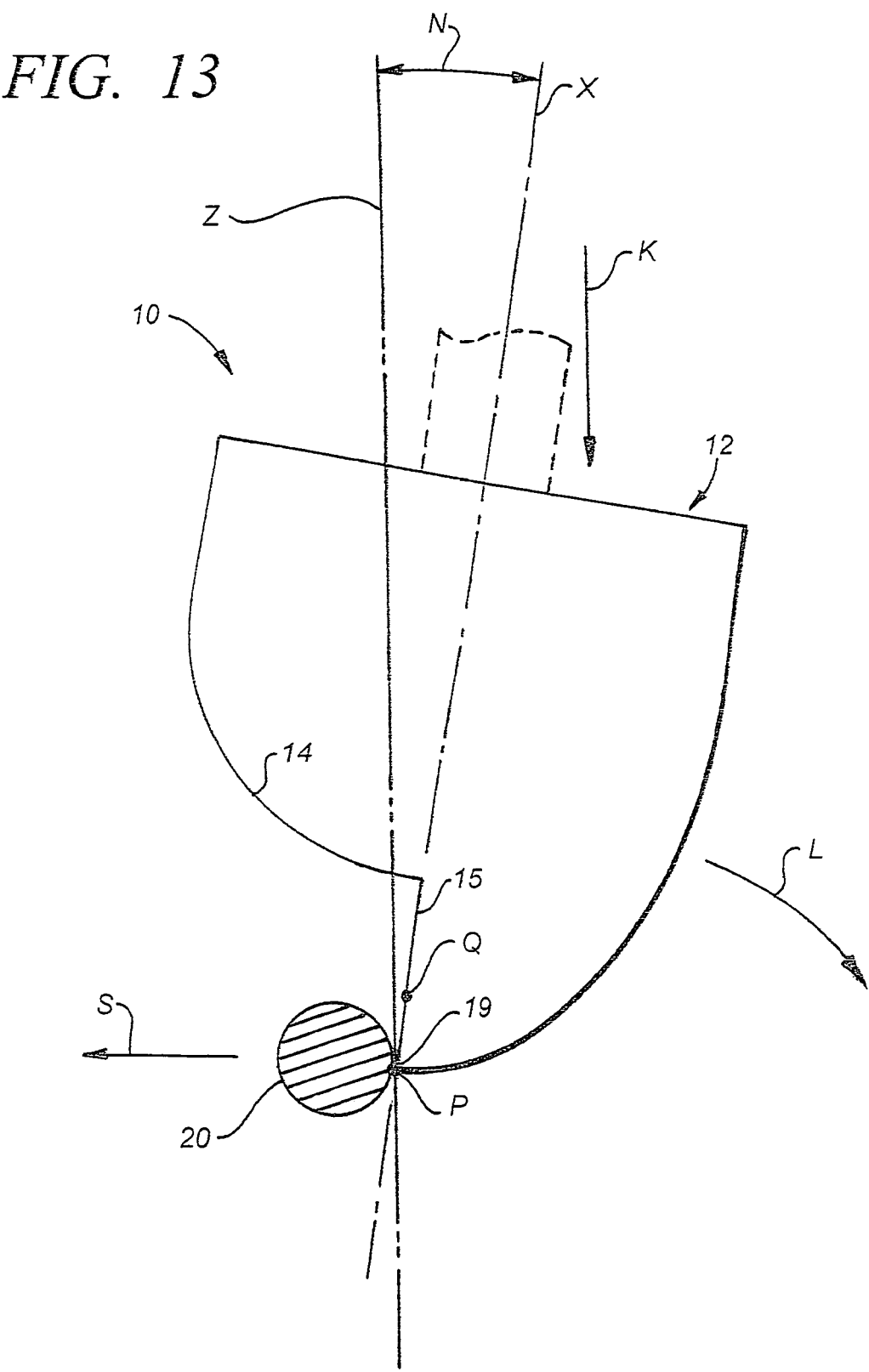
FIG. 13 is a front view further illustrating the mode of operation of the shovel of FIG. 1.

In FIG. 12, the longitudinal axis X is canted from vertical axis Z through the angle M. In FIG. 13, the longitudinal axis X is canted from vertical axis Z through the angle N.

In one embodiment of the invention, handle 11 is grasped adjacent upper edge 19 and head 12 is utilized like a hatchet, with metatarsal edge 15 comprising the "cutting" edge that is strikes a piece of wood or other object to cut the wood.

The shovel 10A in FIG. 2 is comparable to shovel 10 except the arcuate dorsal edge 14 is replaced with horizontally oriented straight dorsal edge 21. Shovel 10A includes handle 11 and head 12A. Head 12A includes face 43A and vertically oriented metatarsal edge 15A.

The shovel 30 in FIG. 3 is comparable to shovel 10 except head 32 is narrower than head 12. Shovel 30 includes handle 31 outwardly depending from head 32. Head 32 includes face 33 and vertically oriented metatarsal edge 35. Dashed line 36 represents the generally semi-circular or semi-elliptical edge that ordinarily would be found on a conventional shovel of the type represented by shovel 30.

FIG. 4 illustrates a conventional shovel 40 including handle 41 and head 42. Head 42 includes a face including surfaces 45, 46, 47 which collectively cant downwardly to and terminate at surface 48. Surface 48 includes leading edge 44. Surface 45 co-terminates with the upper portion or shoulder of head 42.

Shovel 40A in FIG. 5 is generally equivalent to shovel 40 except that metatarsal edge 49 and dorsal edge 44B have, in accordance with the invention, been formed in the shovel. Consequently, leading edge or tip 44 has been shortened to produce a smaller edge or tip 44A, and the size of head 42 has been reduced to produce a surface 48A which is smaller than surface 48. The size of canted surface 46 is also reduced to produce surface 46A. Dashed line 44C indicates an arcuate dorsal edge construct which can, if desired, be utilized in place of dorsal edge 44B. Surface 45 co-terminates with the upper portion or shoulder 43A of the head of the shoulder.

Figure 6:
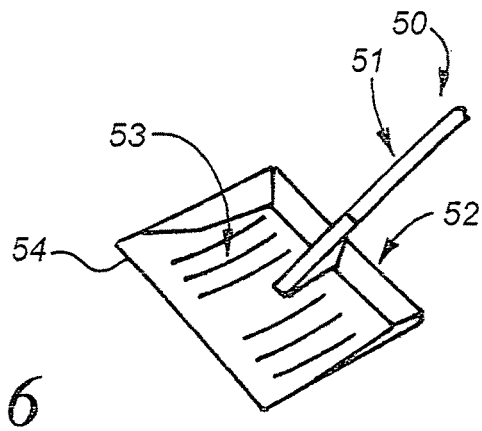
FIG. 6 is a perspective view illustrating a conventional snow shovel.
Figure 7:
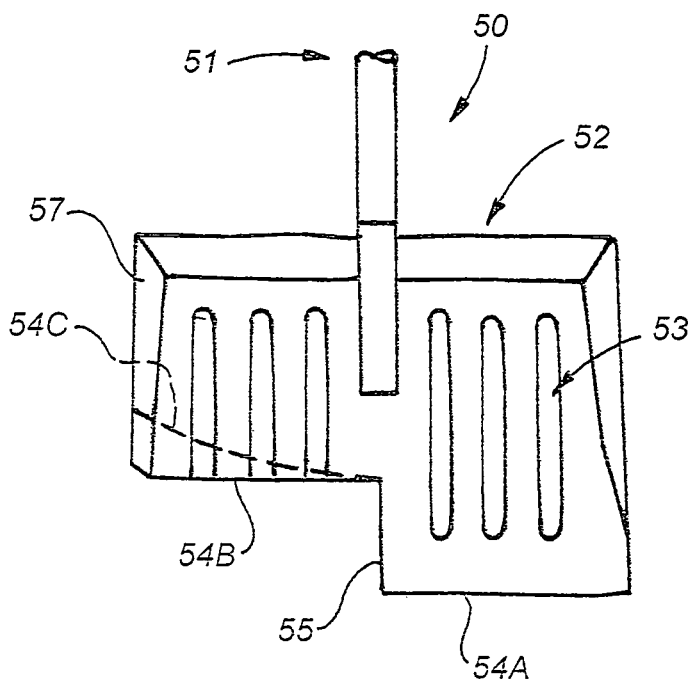
FIG. 7 is a front view illustrating the snow shovel of FIG. 6 modified in accordance with the invention.

The snow shovel 50 illustrated in FIG. 6 includes handle 51 and head 52. Head 52 includes face 53 and leading edge, or tip, 54. In FIG. 7, shovel 50 has been modified in accordance with the invention by forming a vertical metatarsal edge 55 and horizontal dorsal edge 54B in head 52. Dashed line 54C indicates an arcuate dorsal edge which can, if desired, be utilized in place of dorsal edge 54B. Also, in FIG. 6, leading edge, or tip, 54 of shovel 50 has been shorted into tip 54A.

Figure 8:
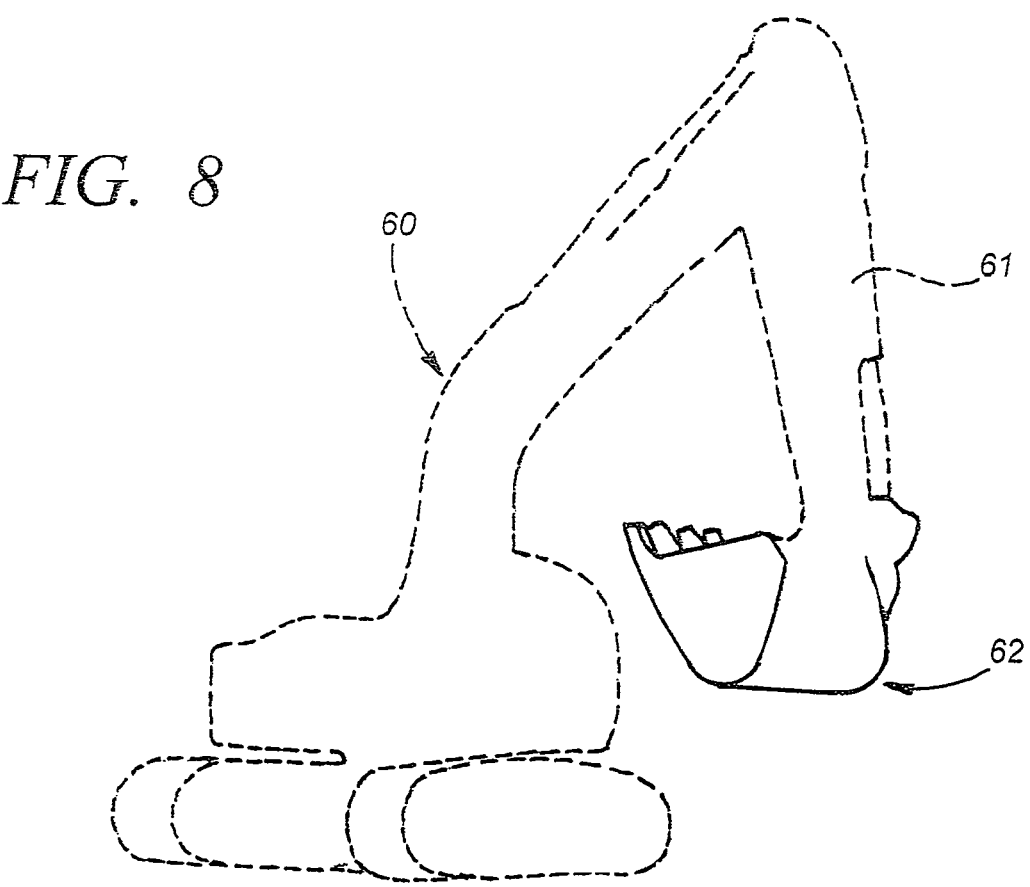
FIG. 8 is a perspective view produced partially as a ghost image and illustrating a conventional shovel utilized on a steam shovel.
Figure 9:
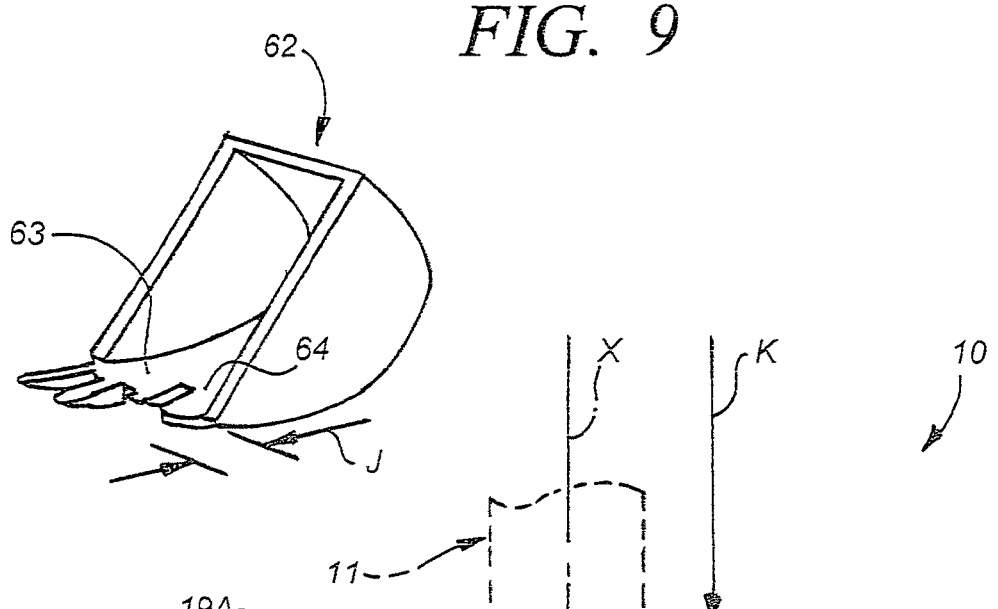
FIG. 9 is a perspective view illustrating the shovel of FIG. 8 modified in accordance with the principles of the invention.

FIG. 8 illustrates a steam shovel 60 with a support arm (i.e., a "handle") 61. Shovel head 62 is mounted on the distal end of arm 61. In FIG. 9, head 62 has been modified in accordance with the invention by shortening one half 64 of the floor of the shovel. The other half 63 of the floor retains its conventional shape and dimension. The amount by which half 64 is shortened, or offset, is indicated by arrows J.

Figure 14:
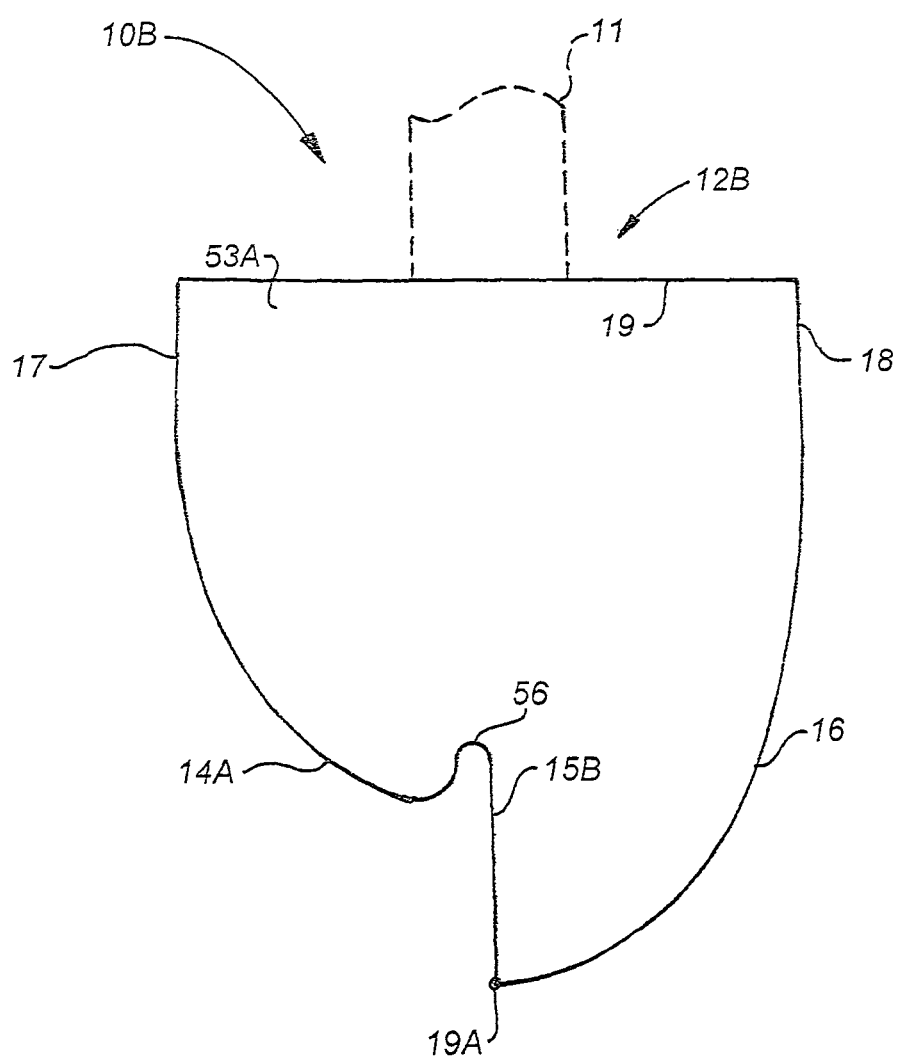
FIG. 14 is a front view illustrating a shovel constructed in accordance with an alternate embodiment of the invention.

FIG. 14 illustrates a shovel 10B constructed in accordance with another embodiment of the invention and including an elongate handle 11, and including a head 12B with a face 53A, with tip 19A, with dorsal edge 14A, with metatarsal edge 15B, with proximate edge 16, with first distal edge 18, and with second distal edge 17. Head 12B also includes one or more notches 56 formed to bridge dorsal edge 14A and metatarsal edge 15B. The shape of notch 56 can vary and can, for example, be V-shaped instead of the U-shape illustrated in FIG. 14. In FIG. 14, the lower end of dorsal edge 14A is adjacent the upper end of metatarsal edge 15B.

Figure 15:
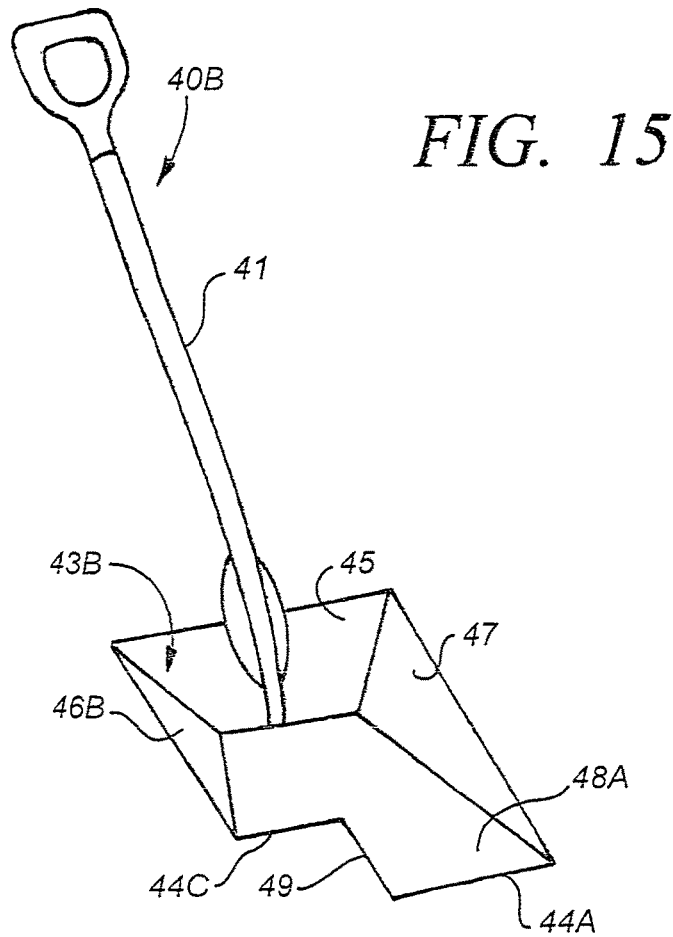
FIG. 15 is a perspective view illustrating a shovel constructed in accordance with still another embodiment of the invention.

Shovel 40B in FIG. 15 is generally equivalent to shovel 40A in FIG. 5 except that the four sided portion of shovel 40A including surface 46A is replaced in shovel 40B by a three sided portion including surface 46B.

Figure 16:
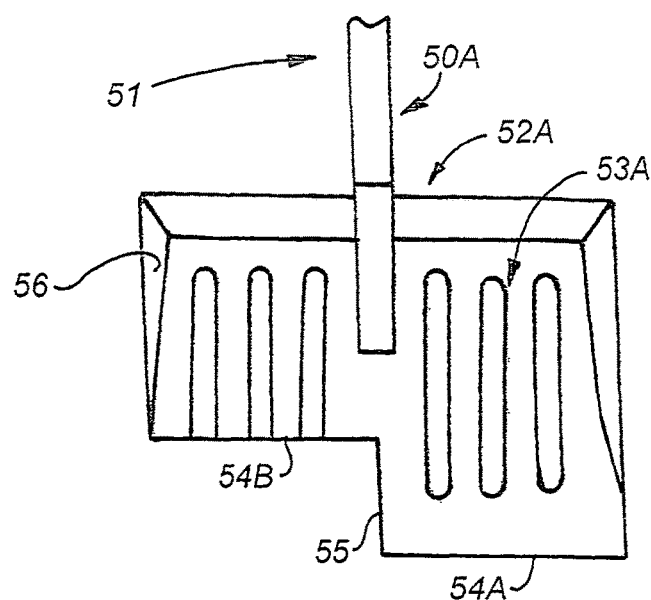
FIG. 16 is a front view illustrating a shovel constructed in accordance with still a further embodiment of the invention.

Similarly, shovel 50A in FIG. 16 is generally equivalent to shovel 50 in FIG. 7 except that the four sided portion of shovel 50 including surface 57 is replaced in shovel 50A by a three sided portion including surface 56. Surface 45 co-terminates with the upper portion or shoulder 43B of the shovel.

Figure 17:
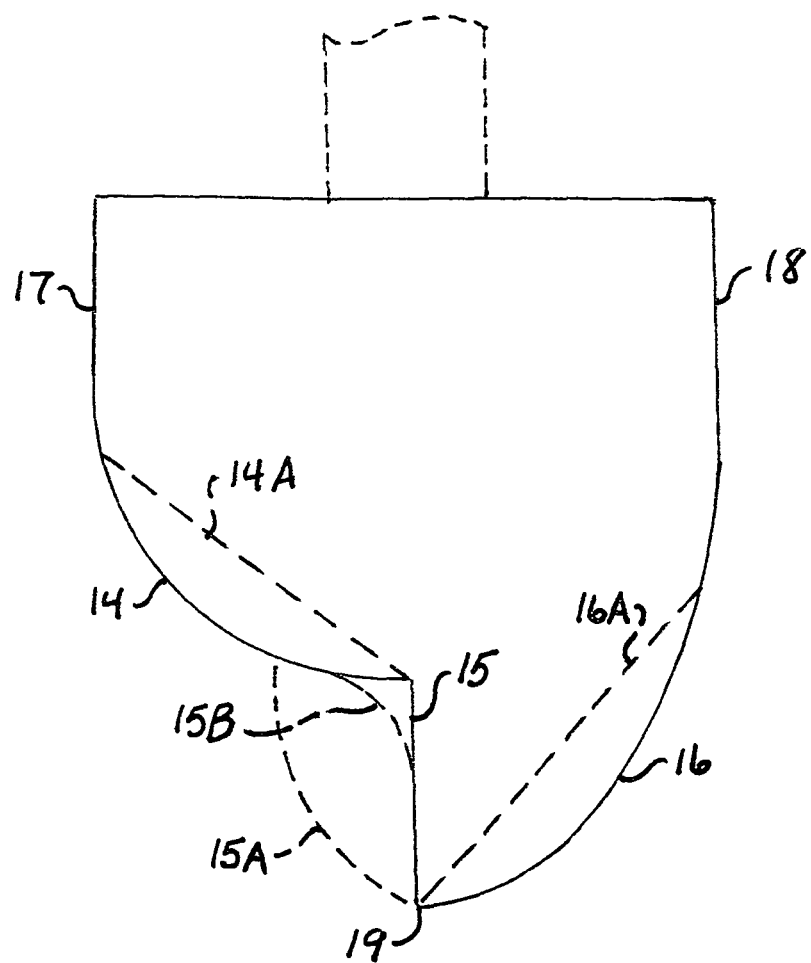
FIG. 17 is a front view illustrating a shovel constructed in accordance with other embodiments of the invention.

FIG. 17 illustrates with dashed lines various other possible embodiments of the invention derived from the shovel illustrated in FIG. 1. As indicated by dashed lines 14A, dorsal edge 14 can be replaced by a relatively straight dorsal edge. Metatarsal edge 15 can, as indicated by dashed lines 15A, be replaced by a vertically oriented convex metatarsal edge. The transition from a metatarsal edge 15 to a dorsal edge 14 can be accomplished using a radial edge indicated by dashed lines 15B. Proximate edge 16 can, as indicated by dashed lines 16A, be replaced by a straight canted vertically oriented edge.

Figure 18:
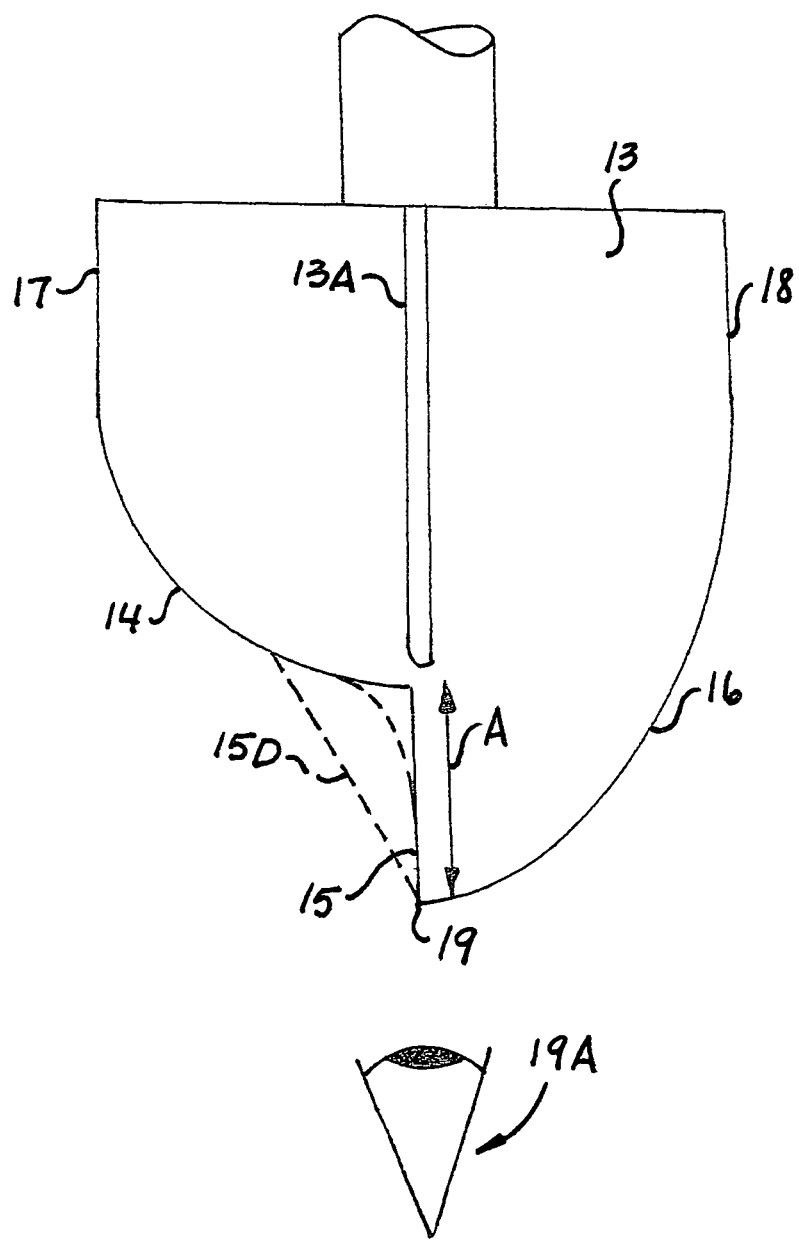
FIG. 18 is a front view illustrating a shovel constructed in accordance with other embodiments of the invention.

In FIG. 18, vertically oriented metatarsal edge 15 can, as indicated by dashed lines 15D, be replaced by a vertically oriented canted edge. One or more ribs 13A can be formed in or on the shovel head to structurally strengthen the head.

Eye 19A illustrates an individual looking upwardly from beneath the head of the shovel. This is the type of view illustrated in FIGS. 23 to 25.

Figure 19:
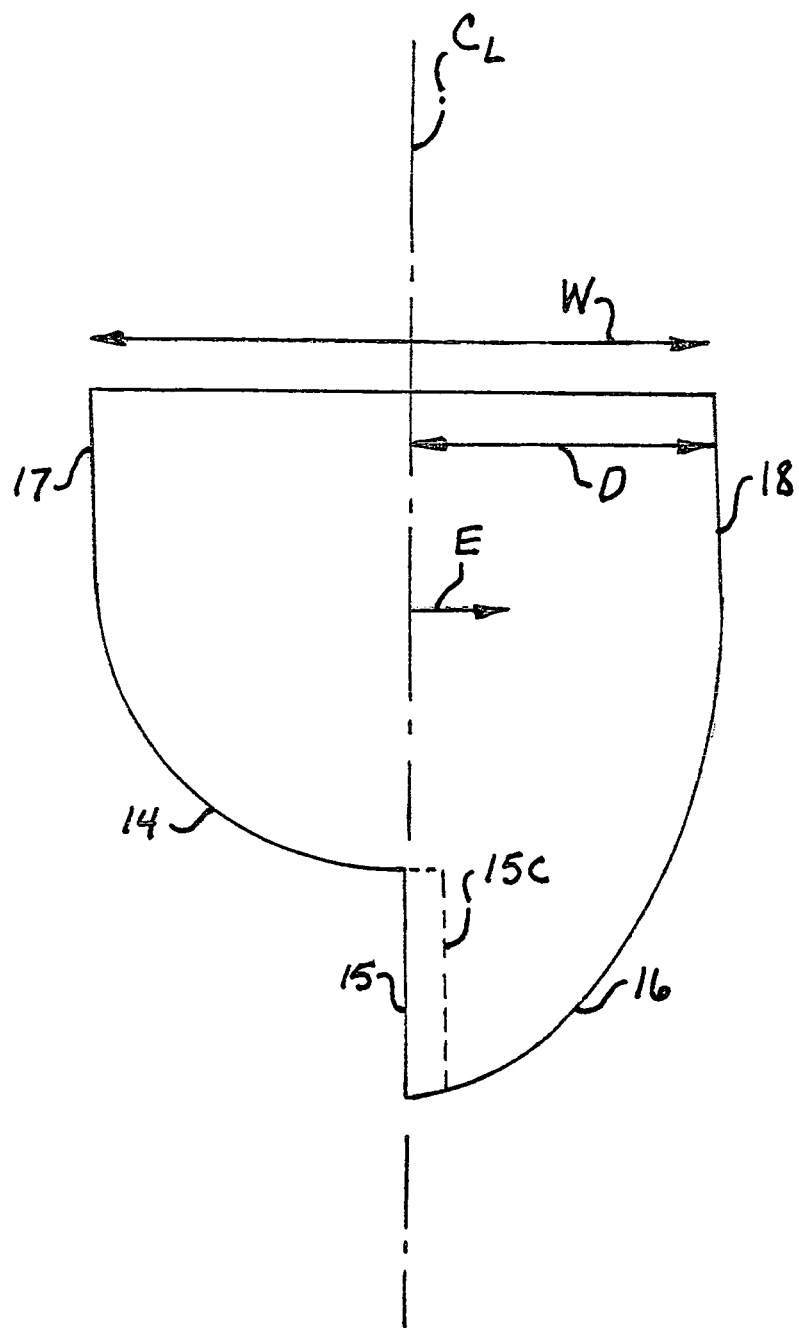
FIG. 19 is a front view illustrating a shovel constructed in accordance with another embodiment of the invention.

In FIG. 19, arrows W indicate the width of the shovel head a measured at the shoulder of the shovel head. Arrows D indicate the width of the right hand side of the shovel head as measured from a vertical axis $C_L$ extending upwardly from and through the tip of the shovel. If, when the head of the shovel is fabricated, the metatarsal edge 15 is moved laterally to the position indicated by dashed lines 15C, then the vertical axis $C_L$ moves laterally in the direction of arrow E, and the width indicated by arrows D is reduced.

Figure 20:
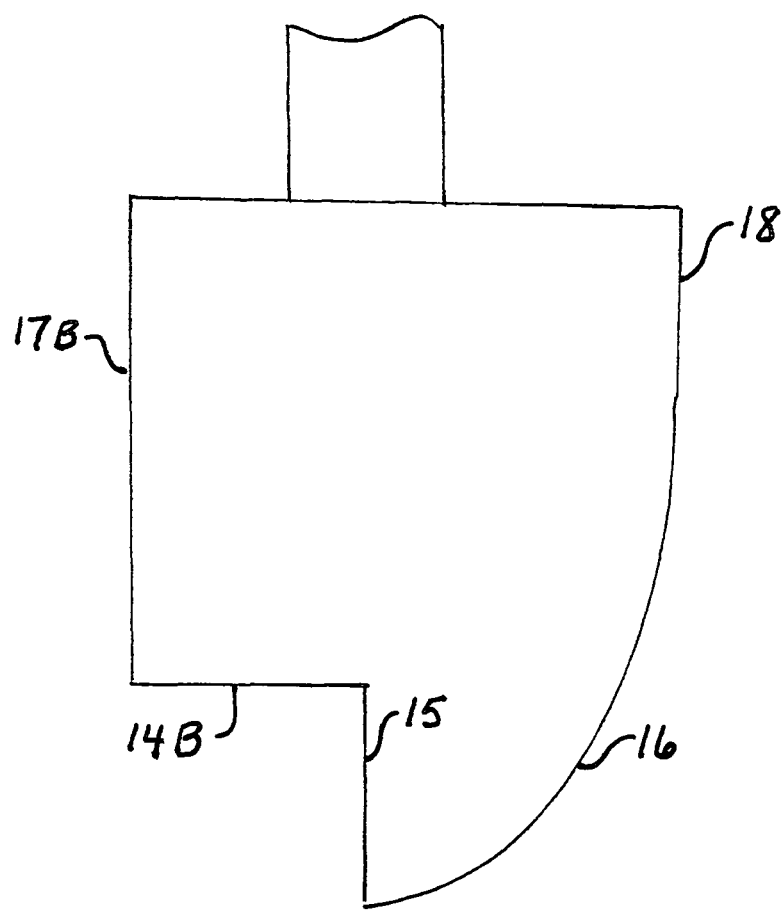
FIG. 20 is a front view illustrating a shovel constructed in accordance with another embodiment of the invention.

In the embodiment of the invention illustrated in FIG. 20, the dorsal edge 14B comprises a horizontally oriented edge which extends from metatarsal edge 15 to the second distal edge 17B.

Figure 21:
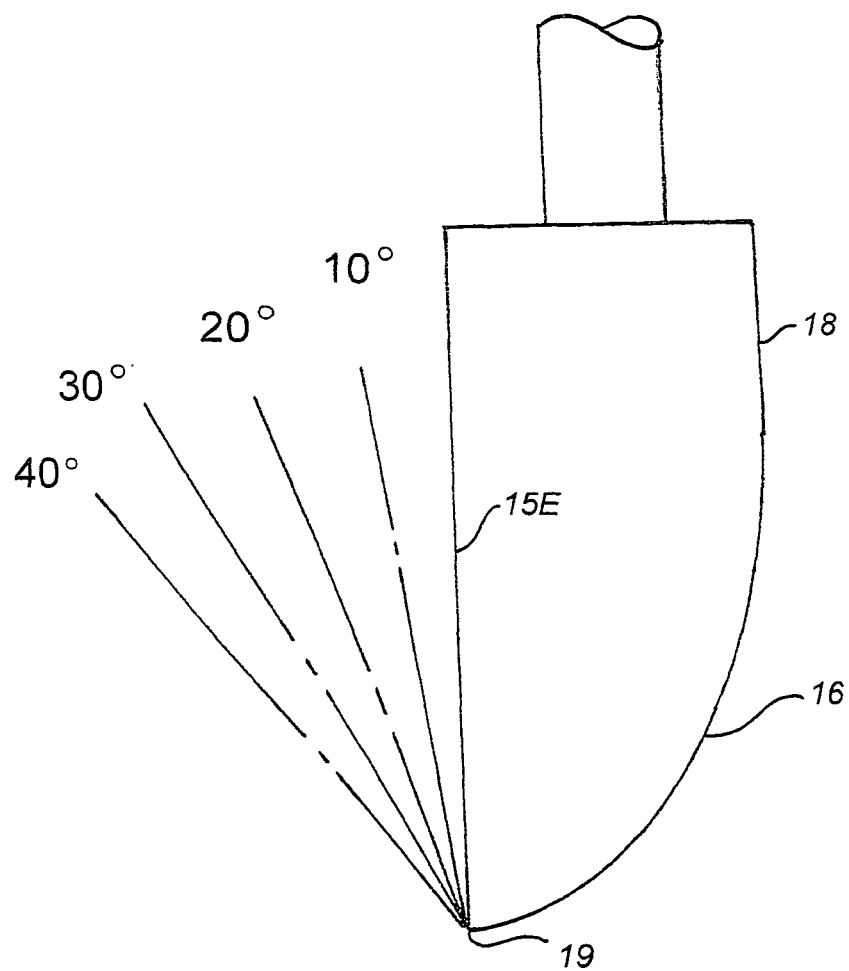
FIG. 21 is a front view illustrating a shovel constructed in accordance with other embodiments of the invention.

FIG. 21 illustrates how the vertically oriented metatarsal edge of the shovel of the invention can cant from the vertical by any desired angle including without limitation angles of 10 degrees, 20 degrees, 30 degrees, and 40 degrees. In currently preferred embodiments of the invention, however, the cant from vertical of metatarsal edge 15E is less than 40 degrees, preferably less than 30 degrees, more preferably less than 20 degrees, and most preferably less than ten degrees.

Figure 22:
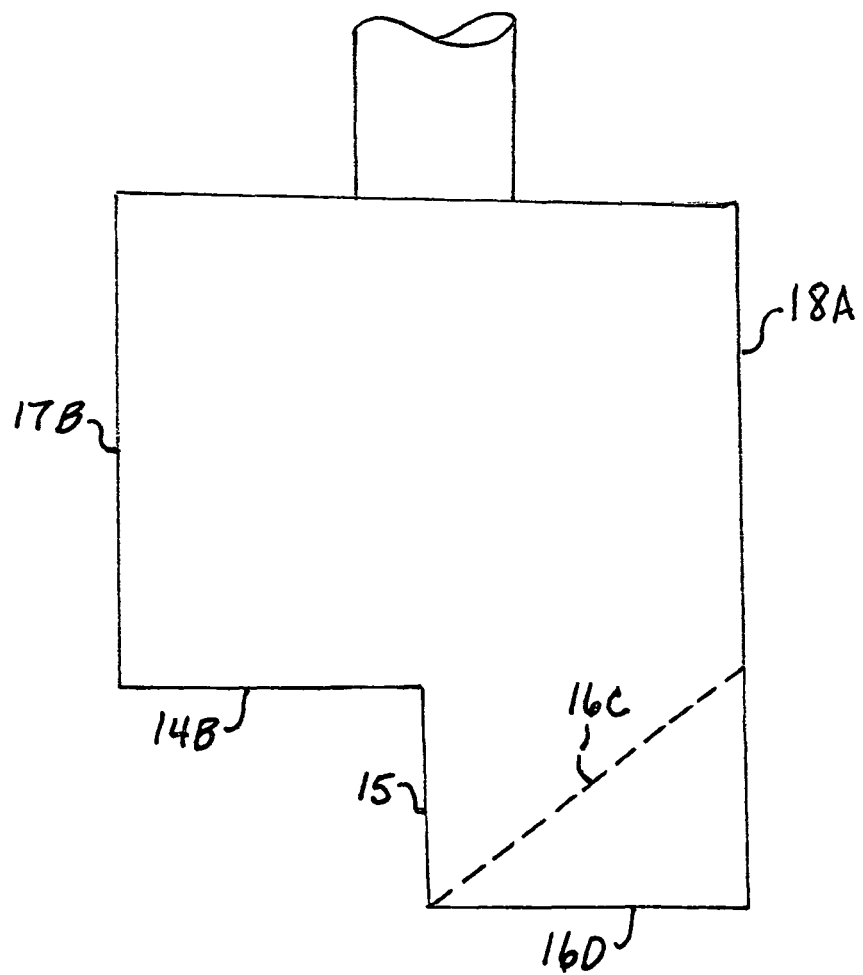
FIG. 22 is a front view illustrating a shovel constructed in accordance with another embodiment of the invention.

In FIG. 22, horizontally oriented dorsal edge 14B extends between metatarsal edge 15 and second distal edge 17B. Tip 16B extends between metatarsal edge 15 and proximate edge 18A. In FIG. 22 there is no first distal edge. As indicated by dashed lines 16C, proximate edge 18A can be supplanted by proximate edge 16C, in which case the remaining portion of edge 18A becomes the first distal edge.

Figure 23:
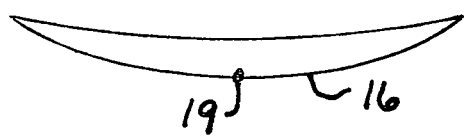
FIG. 23 is a bottom view illustrating the shovel of FIG. 18.
Figure 24:
FIG. 24 is a bottom view illustrating the shovel of FIG. 18 modified by incorporating a downwardly tilted tip.
Figure 25:
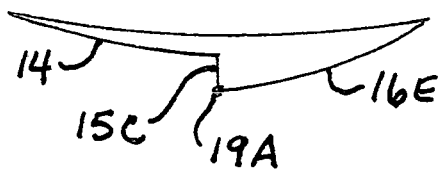
FIG. 25 is a bottom view illustrating the shovel of FIG. 18 modified by incorporating a downwardly tilted tip.

FIG. 23 illustrates the shovel of FIG. 18 as viewed 19A from the bottom of the shovel, except rib 13A is not shown. FIG. 24 illustrates, from the same point of view 19A, a shovel comparable to the shovel of FIG. 18, except that the tip 19B and proximate edge 16B of the shovel are downwardly bent. FIG. 25 also illustrates, from the same point of view 19A, a shovel comparable to the shovel of FIG. 18, except that the tip 19A and proximate edge are downwardly bent to an even greater degree. In FIG. 25, the metatarsal edge is indicated by reference character 15C.

Figure 26:
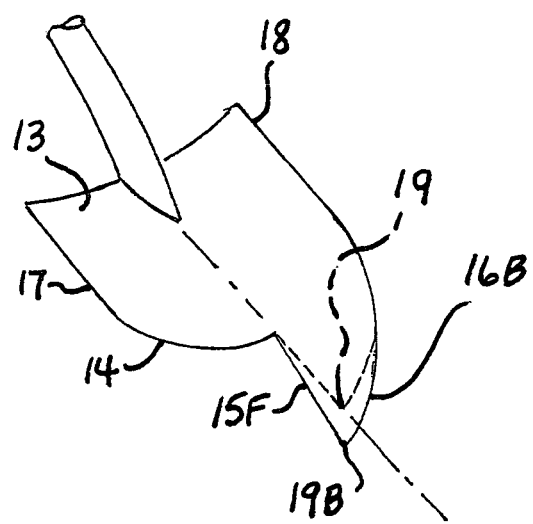
FIG. 26 is a perspective view further illustrating the shovel of FIG. 24.

FIG. 26 illustrates how the tip 19B and proximate edge 16B in FIG. 24 are downwardly bent.

Figure 27:
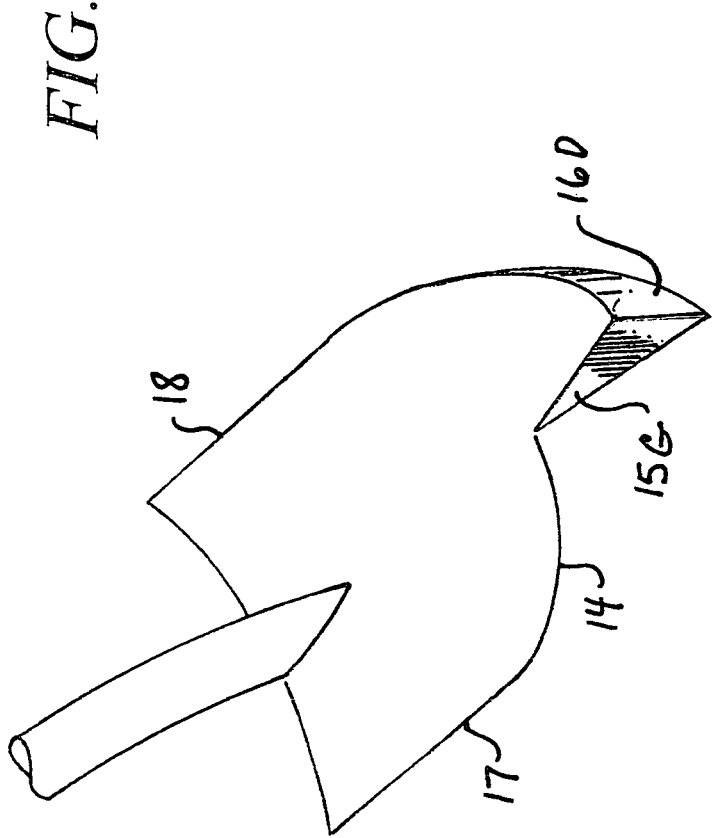
FIG. 27 is a perspective view illustrating another embodiment of the shovel of the invention.

In FIG. 27, the metatarsal edge 15G and proximate edge 16D are widened or thickened to strengthen structurally these portions of the shovel.

Figure 28:
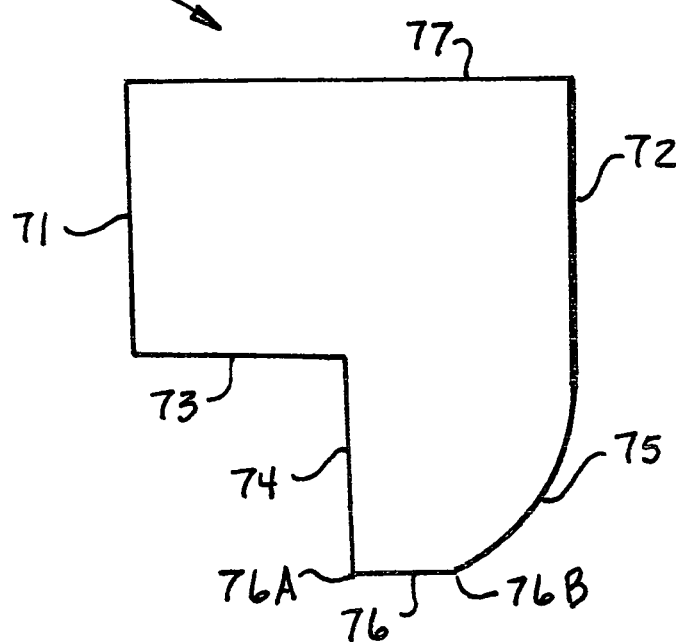
FIG. 28 is a front view illustrating another embodiment of a shovel head utilized in the invention.

The shovel head 70 in FIG. 28 includes shoulder 77, first distal edge 72, second distal edge 71, dorsal edge 73, metatarsal edge 74, tip 76, proximate edge 75, and first distal edge 72.

Figure 29:
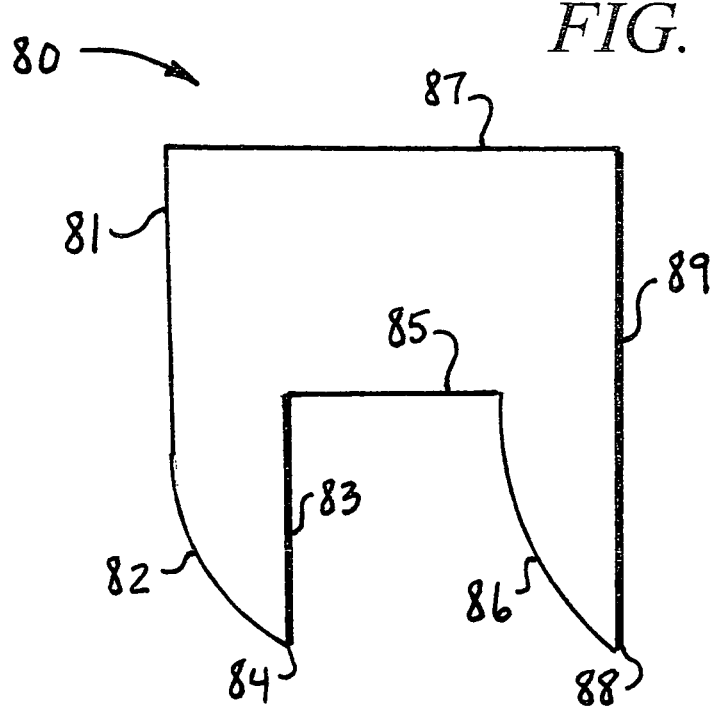
FIG. 29 is a front view illustrating still a further embodiment of a shovel head utilized in the invention.

The shovel head 80 in FIG. 29 includes shoulder 87, first distal edge 89, second distal edge 81, dorsal edge 85, tip 88, metatarsal edge 86, tip 84, metatarsal edge 82, and proximate edge 83.

Figure 30:
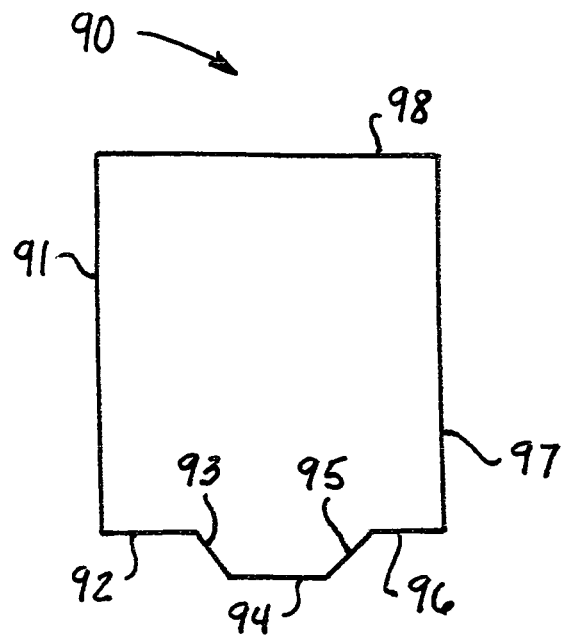
FIG. 30 is a front view illustrating yet still another embodiment of a shovel head utilized in the invention.

The shovel head 90 in FIG. 30 includes shoulder 98, first distal edge 97, second distal edge 91, tip 94, metatarsal edges 93 and 95, and dorsal edges 92 and 96.

Figure 31:
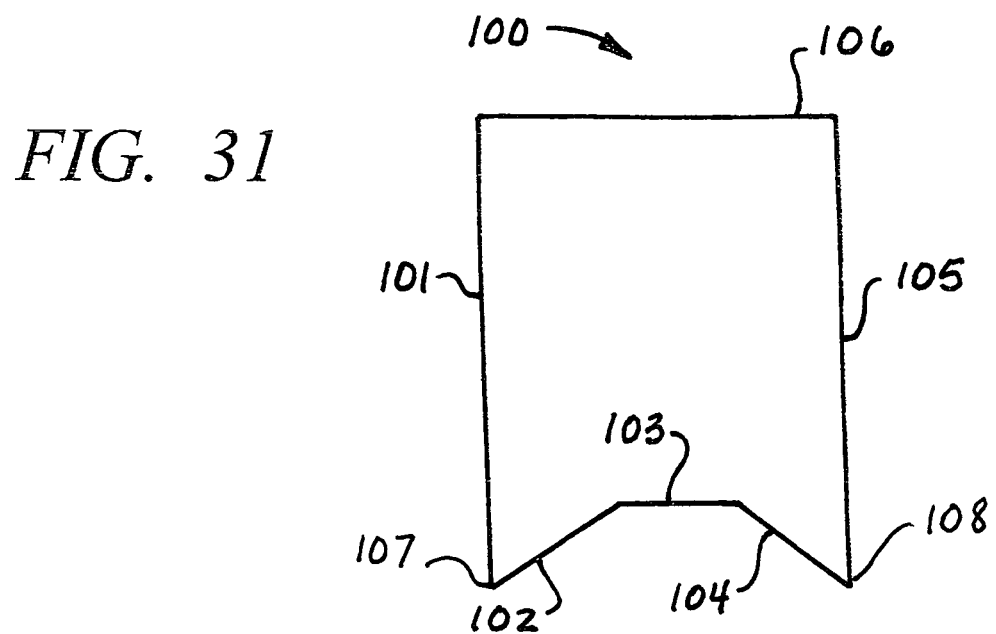
FIG. 31 is a front view illustrating yet still a further embodiment of a shovel head utilized in the invention.

The shovel head 100 in FIG. 31 includes shoulder 106, first proximate edge 105, second proximate edge 101, tip 107, first metatarsal edge 102, tip 108, second metatarsal edge 104, and dorsal edge 103.

Figure 32:
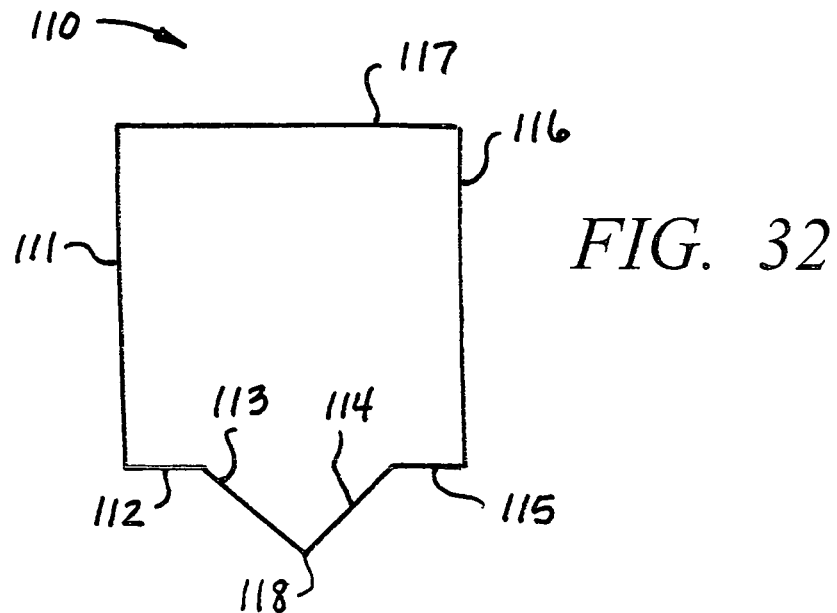
FIG. 32 is a front view illustrating a further embodiment of a shovel head utilized in the invention.

The shovel head 110 in FIG. 32 includes shoulder 117, first distal edge 116, second distal edge 111, tip 118, metatarsal edges 113 and 114, and dorsal edges 112 and 115.

Figure 33:
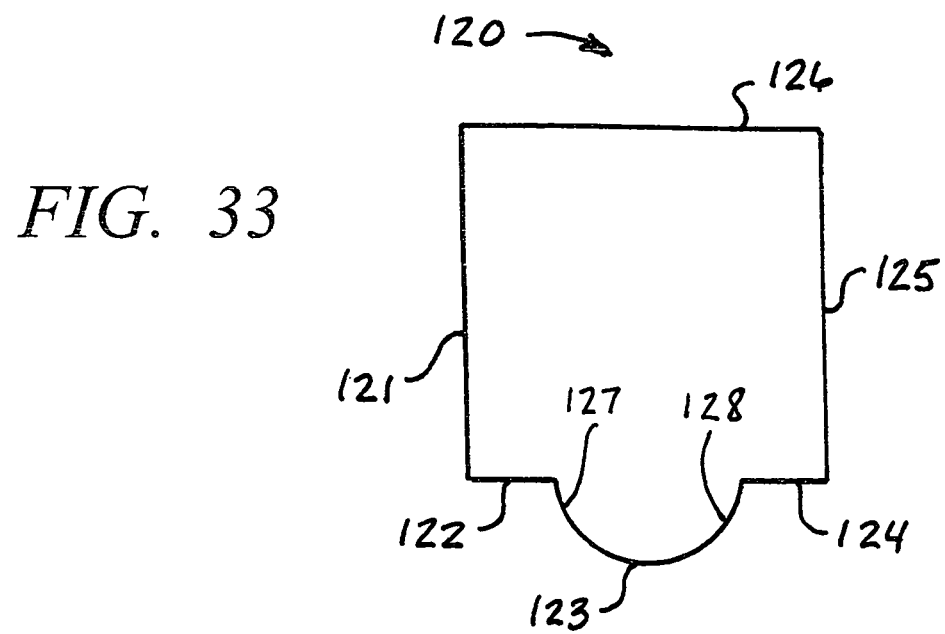
FIG. 33 is a front view illustrating another embodiment of a shovel head utilized in the invention.

The shovel head 120 in FIG. 33 includes shoulder 126, first proximate edge 125, second proximate edge 121, tip 123, arcuate convex metatarsal edges 127 and 128, and dorsal edges 122 and 124.

Figure 34:
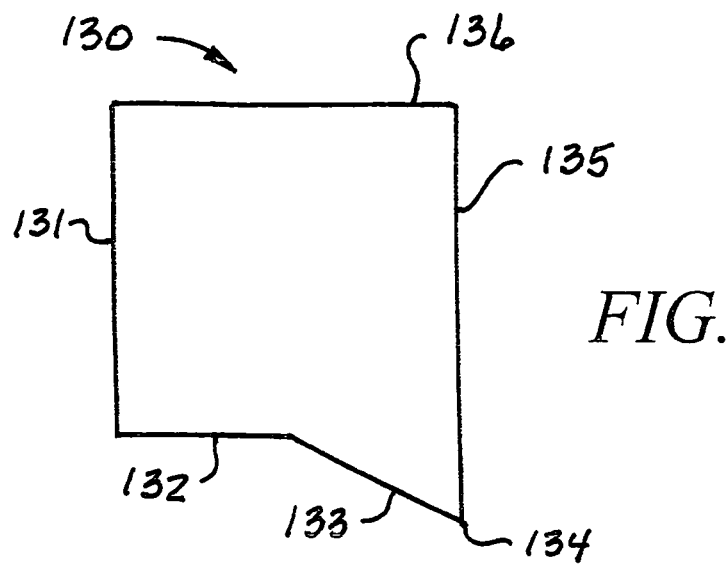
FIG. 34 is a front view illustrating still a further embodiment of a shovel head utilized in the invention; and, FIG. 35 is a front view illustrating still another embodiment of a shovel head utilized in the invention.

The shovel head 130 in FIG. 34 includes shoulder 136, first proximate edge 135, tip 134, metatarsal edge 133, dorsal edge 132, and second proximate edge 131.

Figure 35:
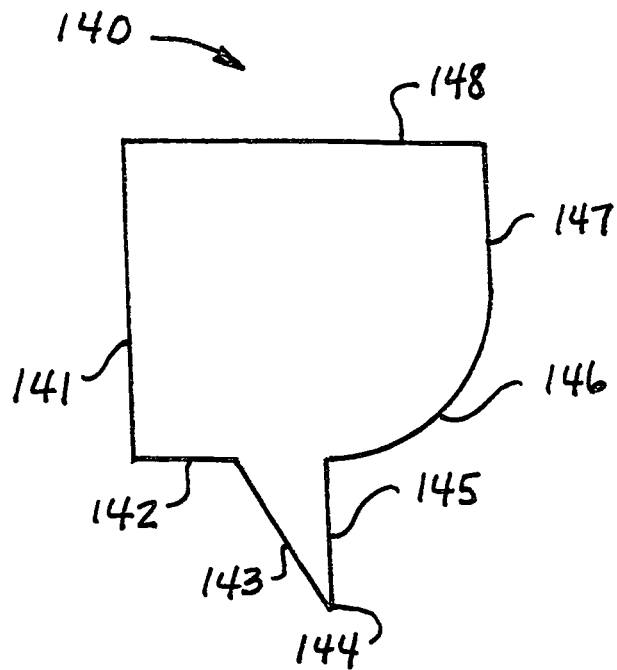

The shovel head 140 in FIG. 35 includes shoulder 148, proximate edge 147, distal edge 141, tip 144, metatarsal edges 143 and 145, and dorsal edges 142 and 146.

A further description of embodiments of the invention is set forth below.

I. The Basic Shovel

The shovel includes a head and a handle attached to and extending outwardly from the head. The head is shaped to be forced into the ground or another material to remove earth or another material.

II. Vertically Oriented and Horizontally Oriented.

The terms vertically oriented and horizontally oriented as used below assume that the shovel is in an upright position with the handle vertically oriented and generally perpendicular to the ground.

III. Left Hand and Right Hand

The terms left hand and right hand as used below assume that the shovel is in an upright position with the handle vertically oriented and generally perpendicular to the ground, and assumes that an observer is positioned forwardly of the shovel in a position where the observer can view the face but not the back of the head of the shovel.

IV. The Head.

The head includes an upper portion connected to the handle, a lower portion which extends downwardly from the upper portion, a front face, a rear face, a starboard (right hand) edge structure, and a port (left hand) edge structure.

A. The upper portion normally is the widest portion of the head, or at least one of the widest portions, and includes a shoulder which extends across the top of the upper portion. A user rests his foot on the shoulder to drive the head into the ground or into another material being moved or excavated with the shovel.

B. The lower portion includes the tip of the shovel.

C. The front face extends over the front of both the upper portion and the lower portion.

D. The rear face is opposed to the front face and extends over the rear of both the upper portion and lower portion.

E. The starboard edge structure extends from the tip of the head up to the shoulder.

F. The port edge structure extends from the tip of the head up to the shoulder.

V. Starboard Edge Structure

The starboard edge structure includes a proximate edge which extends from the tip of the head upwardly along at least a portion of the perimeter of the lower portion of the head. The proximate edge can also extend along at least a portion of the perimeter of the upper portion of the head.

The proximate edge of the starboard edge structure presently normally has a convex arcuate shape. The shape and dimension of the proximate edge can vary as desired. In some shovels, for instance one embodiment of a snow shovel, the proximate edge may comprise a relatively straight edge.

The starboard edge structure can also include a first distal edge which extends from the top of the proximate edge to the shoulder of the head. The first distal edge presently normally is a relatively straight vertically oriented edge, but the shape and dimension can vary as desired.

The proximate edge can, as suggested above, extend from the tip to the shoulder of the head, in which case there is no first distal edge.

VI. Port Edge Structure.

The port edge structure includes a metatarsal edge, a dorsal edge, and a second distal edge.

While the shape and dimension of the metatarsal edge currently is preferably a relatively straight edge which extends generally vertically upwardly from the tip of the head. In the basic shovel the metatarsal edge is vertically oriented. In other embodiments of the invention, the metatarsal edge is canted from the vertical but still extends upwardly from the tip of the head of the shovel.

The shape and dimension of the dorsal edge can vary as desired, but currently is an arcuate edge which extends outwardly and upwardly from the metatarsal edge. Importantly, the dorsal edge is an offset edge because it is offset from the tip of the head of the shovel. The dorsal edge includes an inner end which terminates at or near the top of the metatarsal edge, and includes an outer end.

The dorsal edge presently normally is generally horizontally oriented at least adjacent the upper end of the metatarsal edge, while the metatarsal edge presently is normally generally vertically oriented.

In some embodiments of the invention, the dorsal edge is canted upwardly from the horizontal but still extends outwardly from the upper end of the metatarsal edge.

In some embodiments of the invention, the metatarsal edge and/or the dorsal edge are arcuate or have other desired shapes. Regardless, however, of the shape and dimension of the dorsal and metatarsal edges, the dorsal edge is still offset from the tip of the head of the shovel, and the metatarsal edge extends upwardly from the tip of the head of the shovel. Similarly, regardless of the shape of the proximate edge of the starboard edge structures, the proximate edge extends outwardly and/or upwardly from the tip of the head of the shovel.

Offsetting the dorsal edge is critical in the practice of the invention because it significantly reduces the size of the proximate edge (of the starboard edge structure) which is initially forced into the ground when the shovel is being used.

The second distal edge extends from or near the outer end of the dorsal edge up to the shoulder of the head. The second distal edge presently normally is relatively straight, but the shape and dimension of the second distal edge can vary as desired, as is the case with the other peripheral edges of the shovel of the invention.

The outer end of the dorsal edge can terminate at the shoulder of the head, in which case there is no second distal edge.

VII. Dimensions.

The width of the upper portion of the head of a standard manually operated shovel configured in accordance with the invention to dig dirt can vary as desired, but presently the width of the upper portion of the head is in the range of three inches to ten inches. The basic shovel currently preferred has a shape and dimension comparable to that illustrated in FIGS. 1 and 10 to 13 and, has a width (W1+W2 in FIG. 10) of about nine inches. The width of a snow shovel or other kind of "larger shovel", however, can be up to twenty four inches or more, if desired. The width of a spade or other kind of "smaller shovel" can be less than three inches, if desired.

The greatest width of the lower portion of the head, i.e., the width of a horizontal line (assuming the shovel is, as noted, upright and the handle is vertically oriented) extending from the metatarsal edge 15 to the proximate edge 16 (FIG. 11) or, when appropriate, to the first distal edge, is in the range of 1 inch to 8 inches. In the basic shovel noted above, the greatest width of the lower portion of the head extends from metatarsal edge 15 to proximate edge 16 and is about three inches.

The length, indicated by arrows B in FIG. 10 and arrows A in FIG. 18, of the metatarsal edge is in the range of ½ inch to 6 inches in a standard manually operated shovel for digging dirt, and preferably is in the range of one inch to four inches, more preferably one inch to three inches. The length of the metatarsal edge can vary as desired for other kinds of shovels. In the basic shovel noted above, the length of the metatarsal edge is about two and one-half inches. The length of the metatarsal edge equals the vertical distance traversed by the metatarsal edge; consequently, in FIG. 17, the length of metatarsal edge 15 is the same as the length of the metatarsal edge represented by dashed line 15A because each edge 15, 15A traverses the same vertical distance.

In a similar manner, the length of the proximate edge 16 equals the vertical distance traversed by the proximate edge; accordingly, in FIG. 17 the length of the portion of proximate edge 16 extending from tip 19 to the intersection with the upper end of dashed line 16A is the same as the length of the proximate edge represented by dashed line 16A.

In a similar manner, the length of the dorsal edge equals the horizontal distance traversed by the dorsal edge; accordingly, in FIG. 17 the length of the portion of dorsal edge 14 extending from metatarsal edge 15 to the upper end of dashed line 14A is the same as the length of the metatarsal edge represented by dashed lines 14A.

In a similar manner, the length of the first distal edge or second distal edge equals the vertical distance traversed by the first distal edge or second distal edge.

The height of the head, which extends vertically from the tip of the head to the shoulder of the head can vary as desired, but typically is in the range of six inches to thirteen inches in a standard manually operated shovel for digging dirt. The height of the head can vary as desired for other kinds of shovels. In the basic shovel noted above, the height of the head is about eleven inches. By way of example, in FIG. 1, the height of the head equals the height indicated by arrows A plus the height indicated by arrows B.

The length of the dorsal edge is typically in the range of one inch to eight inches for a standard manually operated shove for digging dirt, but can vary as desired. The length of the dorsal edge can vary as desired for other kinds of shovels. In the basic shovel noted above, the length of the dorsal edge is equal to the width W1 in FIG. 10 and is therefore about five and one-half inches. Consequently, as used herein, the "length" of the dorsal edge is, as noted above, the lateral distance traversed by the dorsal edge in extending from the metatarsal edge to either the second distal edge or to the shoulder of the head of the shovel, as appropriate.

Similarly, the "length" of the proximate edge is the lateral distance traversed by the proximate edge in extending from the tip of the shovel to the first distal edge or to the shoulder of the shovel as appropriate. In the basic shovel noted above, the length of the proximate edge is equal to the width W2 in FIG. 10 and is therefore about five and one-half inches. In FIG. 1, the length of the dorsal edge is indicated by arrows E. The length of the proximate edge is indicated by arrows F. The length of the second distal edge is indicated by arrows D. The length of the first distal edge is indicated by arrows C. The total vertical length traversed by dorsal edge 14 and the second distal edge is indicated by arrows A. The length of the metatarsal edge 15 is indicated by arrows B.

Shovel heads constructed in accordance with the invention will always have a tip, a metatarsal edge, a dorsal edge, and either a proximate edge or a first distal edge.

The shovel head of FIG. 11 includes a tip 19, metatarsal edge 15, dorsal edge 15, second distal edge 17, proximate edge 16, and first distal edge 18.

The shovel head of FIG. 20 includes a tip, metatarsal edge 15, dorsal edge 14B, second distal edge 17B, proximate edge 16, and first distal edge 18.

The shovel head of FIG. 22 includes a tip 16B, metatarsal edge 15, dorsal edge 14B, second distal edge 17B, and first distal edge 18A. The width of tip 16D precludes the existence of a proximate edge.

The shovel head 70 of FIG. 28 includes shoulder 77, tip 76, metatarsal edge 74, dorsal edge 73, second distal edge 71, proximate edge 75, and first distal edge 72.

The shovel head 80 of FIG. 29 includes, shoulder 87 tips 84 and 88, metatarsal edges 83 and 86, dorsal edge 85, first distal edge 89, proximate edge 82, and second distal edge 81.

The shovel head 90 of FIG. 30 includes shoulder 98, tip 94, metatarsal edges 93 and 95, dorsal edges 92 and 96, first distal edge 97, and second distal edge 91.

The shovel head 100 of FIG. 31 includes shoulder 106, tips 107 and 108, metatarsal edges 102 and 104, dorsal edge 103, first distal edge 105, and second distal edge 101.

The shovel head 110 of FIG. 32 includes shoulder 117, tip118, metatarsal edges 113 and 114, dorsal edges 112 and 115, first distal edge 116, and second distal edge 111.

The shovel head 120 of FIG. 33 includes shoulder 126, tip 123, metatarsal edges 127 and 128, dorsal edges 122 and 124, first distal edge 125, and second distal edge 121. The arcuate tip 123 "feathers" smoothly into metatarsal edges 127 and 128.

The shovel head 130 of FIG. 34 includes shoulder 136, tip 134, metatarsal edge 133, dorsal edge 132, first distal edge 135, and second dorsal edge 131.

The shovel head 140 of FIG. 35 includes shoulder 148, tip 144, metatarsal edge 143, dorsal edge 142, second distal edge 141, first distal edges 145 and 147, and proximate edge 146.

VIII. Offset of the Dorsal Edge.

As noted, the offset of the dorsal edge from the tip of the head of the shovel is, as noted, critical in the practice of the invention. The end of the dorsal edge which is near or co-terminates at the upper end of the metatarsal edge is a distance from the tip which is in the range of 5% to 75%, preferably 10% to 65%, more preferably 15% to 50%, and most preferably 20% to 40%, of the height of the head of the shovel.

IX. Ribs.

The head of the shovel can include ribs which structurally strengthen the head. Raised ribs can be stamped into the head, can be welded on to the head, or can otherwise be formed on or in the head.

X. Asymmetry.

The shape of the head of the shovel of the invention is presently preferably necessarily asymmetrical, although symmetrical embodiments of the invention are, as can be seen in the drawings, possible.

XI. Sides.

When the asymmetrical shovel of FIG. 10 (or FIGS. 1-3, 11 to 14, 17 to 20, 23 to 27, 35) is upright with the handle generally vertically oriented, when the tip 19 of the shovel is generally centrally located and is a point in the manner illustrated in FIG. 10, and an imaginary vertical line is drawn which extends upwardly from the tip 19, the left side of the shovel head extends to the left of the vertical line and the right side of the shovel head extends to the right of the vertical line. The size of the left side and of the surface area of the portion of the face of the shovel head which extends over the left side is smaller than the size of the right side and of the surface area of the portion of the face of the shovel which extends over the right side (or vice-versa if the offset 14 is on the right side of the head instead of the left side as shown in FIG. 10).

When the asymmetrical shovel of FIG. 28 (or FIGS. 5, 17, 15, 22) is upright with the handle generally vertically oriented, when the tip 76 of the shovel is a horizontal edge which terminates at two spaced apart points 76A and 76B, one point 76A of which is centrally located on the head of the shovel, and an imaginary vertical line is drawn which extends upwardly from the centrally located point 76A, the left side of the shovel head extends to the left of the vertical line and the right side of the shovel head extends to the right of the vertical line. The size of the left side and of the surface area of the portion of the face of the shovel head which extends over the left side is smaller than the size of the right side and of the surface area of the portion of the face of the shovel which extends over the right side (or vice-versa if the offset 14 is on the right side of the head instead of the left side as shown in FIG. 10).

XII. Static Friction.

The offset dorsal edge of the port edge structure of the shovels of FIGS. 1-3, 5, 7, 9 to 20, 22 to 28, 34 and 35 (1) minimizes the static friction which must be overcome to force the tip of the shovel head into the ground or other material, and (2) increases the force per unit area which is generated at the tip of the shovel when the shovel head is forced into the ground (in comparison to a conventional symmetrical shovel head of the general type illustrated in FIGS. 4 and 6 and suggested by dashed lines 36 in FIG. 3 and dashed lines 15B in FIG. 2).

XIII. Delayed Engagement and Kinetic Friction.

When the head of the shovels of FIGS. 1-3, 5, 7, 9 to 20, 22 to 28, 34 and 35 is initially pressed into the ground or other material, only the larger side of the head slides into the ground, which reduces the kinetic friction which is produced between the ground and the shovel (in comparison to a conventional symmetrical shovel head of the general type illustrated in FIGS. 4 and 6, suggested by dashed lines 15B in FIG. 2, and suggested by dashed lines 36 in FIG. 3).

XIV. Fulcrum.

The dorsal and metatarsal edges of the shovels of FIGS. 1-3, 5, 7, 9 to 20, 22 to 28, 34 and 35 can individually or in tandem readily function as a fulcrum, which facilitates the manipulation of the shovel head in the ground.

XV. Characteristics of the Doral Edge.

The dorsal edge of the shovel head of the invention:
A. Extends from the interior area of the shovel head outwardly away from the tip of the shovel head.
B. Can, in the embodiments of the type depicted in FIGS. 1, 3, 5 (dashed line 44C), 7 (dashed line 54B), 10 to 14, 17 to 19, 23 to 26, 29, extend from the interior area of the shovel head upwardly toward the shoulder and away from the tip of the head.
C. Can, in the embodiments of the type depicted in FIGS. 2, 5, 7, 15, 16, 20, 22, 28, 29, 30 to 35, extend horizontally away from the metatarsal edge.
D. Is offset along its entire length upwardly from the tip and from the lower end of the metatarsal edge.
E. Has a ratio of the length of the lateral distance over which the dorsal edge extends to the width (at the shoulder) of the shovel head in the range of 1:1.25 to 1:6, preferably 1:1.3 to 1:4.
F. Normally does not to any significant degree extend downwardly, but rather extends horizontally or upwardly as depicted in the drawings. The dorsal edge can, if desired, be canted downwardly.
G. Normally begins at or adjacent the metatarsal edge.
H. Normally begins at substantially the same elevation as the upper end of the metatarsal edge.

There is at least one dorsal edge. In FIG. 32, there are a pair of dorsal edges 112 and 115. In FIG. 1, the lateral distance that dorsal edge 14 extends is indicated by arrows E. The lateral distance that the proximate edge extends is indicated by arrows F. The vertical distance that the metatarsal 15 edge extends is indicated by arrows B. The vertical distance that the first distal edge extends is indicated by arrows C. The vertical distance that the second distal edge extends is indicated by arrows D. The vertical distance from the top of the metatarsal edge 15 to the shoulder of the shovel head is indicated by arrows A.

XVI. Characteristics of the Metatarsal Edge.

The metatarsal edge:
A. Extends vertically upwardly from the tip toward the handle and shoulder and into the interior area of the shovel.
B. Has a ratio of vertical distance traversed by the metatarsal edge to the length of the shovel head in the range of 1:1.75 to 1:22, preferably 1:2 to 1:11, and more preferably 1:1.75 to 1:7.4.
C. Has an upper end which in many embodiments of the invention terminates at or adjacent the inner end of the dorsal edge.

There is at least one metatarsal edge. In FIG. 32, there are two metatarsal edges 113, 114.

The following examples are presented by way of illustration, and not limitation, of the invention.

EXAMPLE 1

The shovel of FIG. 1 is utilized to gain access to a buried PVC water pipe. The shovel is first utilized to dig down to and clear earth from the top of the water pipe so the top of the pipe is visible. The dorsal edge 14 is then, with the handle of the shovel vertically oriented, placed on the top of the pipe such that a portion of the end of the dorsal edge 14 adjacent the top of the metatarsal edge contacts the top of the pipe, such that a portion of the top of the metatarsal edge near the dorsal edge also contacts the pipe, and such that the tip 19 is pressed into the ground to one side of the pipe. The handle of the shovel is then canted away from its vertical orientation through an angle of thirty degrees (or any other desired angle) such that the head, while the dorsal and metatarsal edges continue to contact the pipe, pivots about the pipe such that tip 19 (FIG. 10) pivots to a position beneath the pipe. The handle is then used to slide the head of the shovel along the pipe while the metatarsal and dorsal edges continue to contact the pipe. When the head slides along the pipe in this manner, tip 19 loosens and helps removed earth that is beneath the pipe.

EXAMPLE 2

The shovel of FIGS. 1 and 10 is utilized to remove weeds. While the handle 11 is in a substantially vertical orientation, the shovel head is pressed into the ground such that tip 19 drives into the ground adjacent the base and root of the weed. Handle 11 is then pulled away from the weed to a canted position such that tip 19 pries the weed upwardly out of the ground.

EXAMPLE 3

The shovel of FIGS. 1, 10, 11 is utilized. A trench is formed adjacent but spaced apart from the foundation of a home to receive a liquid fluid which deters termites. The trench is formed by maintaining the shovel handle 11 in a relatively upright orientation while sliding the proximate edge 16 along the foundation of the house and moving the tip 19 through the ground to form a trench in the ground. Since tip 19 is, while the proximate edge 16 slides along the foundation, spaced away from the foundation, the trench formed by tip 19 is also spaced away from the foundation. While the proximate edge 16 slides along the foundation, the shovel head is substantially perpendicular to the foundation such that the second distal edge 17 and dorsal edge 14 are spaced away from the foundation.

EXAMPLE 4

A small tree or shrub is being removed. The tree has a root ball. The shovel of FIGS. 1, 10, 11 is utilized. The shovel is driven into the ground such that tip 19 penetrates into the root ball. The handle 11 of the shovel is then pulled downwardly away from the tree such that tip 19 rotates upwardly and functions to pry upwardly the root ball from the ground. Tip 19 often can readily penetrate a root ball whereas the rounded tip of a conventional shovel cannot penetrate the root ball.

EXAMPLE 5

The shovel of FIGS. 1, 10, 11 is utilized to shovel gravel into a wheel barrow. The point tip 19 facilitates driving the head of the shovel into the gravel in order to lift gravel into the wheel barrow.

EXAMPLE 6

The shovel of FIGS. 1, 10, 11 is utilized. A building is demolished. The shovel is employed as a pry bar. The tip 19 is pressed into a space or crevice between a pair of boards.

The handle of the shovel is pulled downwardly or upwardly such that the tip 19 pries apart the boards. A conventional shovel typically cannot be used in this manner because the concave shape of the face of the shovel limits the ability to drive the tip of the conventional shovel into a narrow space between a pair of boards.

Having set forth the presently preferred embodiments of our invention in such terms as to enable those skilled in the art to make and use the invention, Having set forth the presently preferred embodiments of our invention in such terms as to enable those skilled in the art to make and use the invention, I claim:

1. A shovel comprising:
   (a) an elongate handle having a proximate end, a distal end, and a longitudinal axis; and,
   (b) an asymmetrical head including
      (i) an upper end connected to said distal end of said handle, said upper end having first and second peripheral side edges which are generally parallel to said longitudinal axis,
      (ii) a lower end spaced apart from said upper end and said distal end of said handle, said lower end having a ground engaging edge,
      (iii) a face extending over said upper and lower ends, and
   said lower end's ground engaging edge including
      (iv) a first convex arcuate peripheral proximate edge which extends upwardly from said tip to said first peripheral side edge,
      (v) a second convex arcuate peripheral dorsal edge spaced apart from said first arcuate peripheral edge, said second convex arcuate peripheral edge having an end point spaced longitudinally apart from and positioned above said tip and below said upper end of said head, and said second convex arcuate peripheral edge extending upwardly from said end point to said second peripheral side edge, and
      (vi) a metatarsal edge which extends from said tip upwardly to said end point, said metatarsal edge being straight, vertically oriented and extending parallel to said handle's longitudinal axis.

* * * * *